(12) United States Patent
Asakura

(10) Patent No.: US 12,368,979 B2
(45) Date of Patent: Jul. 22, 2025

(54) SOLID-STATE IMAGING ELEMENT, IMAGING DEVICE, AND METHOD FOR CONTROLLING SOLID-STATE IMAGING ELEMENT

(71) Applicant: Sony Semiconductor Solutions Corporation, Kanagawa (JP)

(72) Inventor: LuongHung Asakura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 129 days.

(21) Appl. No.: 18/549,277

(22) PCT Filed: Jan. 13, 2022

(86) PCT No.: PCT/JP2022/000866
§ 371 (c)(1),
(2) Date: Sep. 6, 2023

(87) PCT Pub. No.: WO2022/209126
PCT Pub. Date: Oct. 6, 2022

(65) Prior Publication Data
US 2024/0171884 A1    May 23, 2024

(30) Foreign Application Priority Data
Mar. 30, 2021 (JP) ................. 2021-057205

(51) Int. Cl.
*H04N 25/771* (2023.01)
*H04N 25/532* (2023.01)
(Continued)

(52) U.S. Cl.
CPC ......... *H04N 25/771* (2023.01); *H04N 25/532* (2023.01); *H04N 25/65* (2023.01); *H04N 25/78* (2023.01)

(58) Field of Classification Search
CPC .... H04N 25/771; H04N 25/532; H04N 25/65; H04N 25/78
See application file for complete search history.

(56) References Cited

U.S. PATENT DOCUMENTS

| 10,560,646 B2 * | 2/2020 | Milkov ................. H04N 25/59 |
| 2019/0327432 A1 * | 10/2019 | Milkov ................. H10F 39/809 |

FOREIGN PATENT DOCUMENTS

| JP | 2014096669 A | 5/2014 |
| JP | 2019062400 A | 4/2019 |
| JP | 2019125945 A | 7/2019 |

OTHER PUBLICATIONS

International Search Report (PCT/ISA/210), International Application No. PCT/JP2022/000866, dated Mar. 29, 2022.
(Continued)

*Primary Examiner* — Nicholas G Giles
(74) *Attorney, Agent, or Firm* — Michael Best & Friedrich LLP

(57) ABSTRACT

To improve image quality in a solid-state imaging element that simultaneously performs exposure in all pixels. Arranged in a pre-stage circuit are a pair of floating diffusion layers that converts transferred charges into a voltage, and a conversion efficiency control transistor that controls conversion efficiency with which the charges are converted into voltage by opening and closing a path between the pair of floating diffusion layers. First, second, third, and fourth capacitive elements have their respective one ends commonly connected to the pre-stage circuit. The selection circuit selects one of their respective other ends of the first, second, third, and fourth capacitive elements and connects the selected other end to a predetermined post-stage node. The post-stage circuit reads, via the post-stage node, a reset level obtained by amplifying the voltage when the pair of
(Continued)

floating diffusion layers is initialized and a signal level obtained by amplifying the voltage when the charges are transferred.

10 Claims, 30 Drawing Sheets

(51) Int. Cl.
*H04N 25/65* (2023.01)
*H04N 25/78* (2023.01)

(56) References Cited

OTHER PUBLICATIONS

Ken Miyauchi, et al., "A Stacked Back Side-Illuminated Voltage Domain Global Shutter CMOS Image Sensor with a 4.0 μm Multiple Gain Readout Pixel," Sensors 2020, 20, 486.

* cited by examiner

FIG. 4

|  | SINGLE-GAIN DRIVE ||  DUAL-GAIN DRIVE |
|---|---|---|---|
|  | LOW CONVERSION EFFICIENCY | HIGH CONVERSION EFFICIENCY |  |
| INPUT REFERRED NOISE | × | ○ | ○ |
| Qs | ○ | × | ○ | a b

*FIG. 23*

| L_rst | L_set | LT | VCO | LTO |
|---|---|---|---|---|
| 1 | 0/1 | 0/1 | 0/1 | 0 |
| 0 | 1 | 0/1 | 0/1 | 1 |
| 0 | 0 | 1 | 0 | 0 |
| 0 | 0 | 1 | 1 | 1 |
| 0 | 0 | 0 | 0/1 | LAST VALUE |

SOLID-STATE IMAGING ELEMENT, IMAGING DEVICE, AND METHOD FOR CONTROLLING SOLID-STATE IMAGING ELEMENT

TECHNICAL FIELD

The present technology relates to a solid-state imaging element. Specifically, the present technology relates to a solid-state imaging element, an imaging device, and a method for controlling a solid-state imaging element in which analog to digital (AD) conversion is performed for each column.

BACKGROUND ART

Conventionally, for a solid-state imaging element, in order to miniaturizing pixels, a column analog to digital converter (ADC) method in which with an ADC arranged for each column outside a pixel array unit, pixel signals are sequentially read row by row has been used. In this column ADC method, in a case where exposure is performed by a rolling shutter method in which exposure starts row by row, there is a possibility that rolling shutter distortion occurs. Therefore, in order to realize a global shutter method in which exposure simultaneously starts in all pixels, a solid-state imaging element in which a plurality of capacitors is provided for each pixel, and the capacitors hold a reset level and a signal level has been proposed (for example, refer to Non-Patent Document 1). In this solid-state imaging element, two vertical signal lines are wired for each column, the reset level and the signal level are simultaneously read, and a buffer circuit and an ADC for obtaining a difference between the levels are arranged for each column.

CITATION LIST

Non-Patent Document

Non-Patent Document 1: Ken Miyauchi, et al., A Stacked Back Side-Illuminated Voltage Domain Global Shutter CMOS Image Sensor with a 4.0 µm Multiple Gain Readout Pixel, Sensors 2020, 20, 486.

SUMMARY OF THE INVENTION

Problems to be Solved by the Invention

In the above-described conventional technology, the reset level and the signal level are held in the plurality of capacitors for each pixel, thereby realizing the global shutter method based on the column ADC method. However, noise may occur in the pixel signal due to a path of the two vertical signal lines or an offset component of the ADC. As a result, there is a problem that the image quality of image data deteriorates.

The present technology has been made in view of such circumstances, and it is therefore an object of the present technology to improve image quality for a solid-state imaging element in which all pixels are simultaneously exposed.

Solutions to Problems

The present technology has been made to solve the above-described problems, and a first aspect of the present technology includes a solid-state imaging element and a method for controlling a solid-state imaging element, the solid-state imaging element including a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged, first, second, third, and fourth capacitive elements having their respective one ends commonly connected to the pre-stage circuit, a selection circuit that selects one of their respective another ends of the first, second, third, and fourth capacitive elements and connects the selected another end to a predetermined post-stage node, and a post-stage circuit that reads, via the post-stage node, a reset level obtained by amplifying the voltage when the pair of floating diffusion layers is initialized and a signal level obtained by amplifying the voltage when the charges are transferred. This configuration brings about an effect of improving image quality for the solid-state imaging element.

Furthermore, according to the first aspect, the conversion efficiency control transistor may control the conversion efficiency to either high conversion efficiency higher than a predetermined value or low conversion efficiency lower than the predetermined value, the first capacitive element may hold the reset level when the conversion efficiency is the high conversion efficiency as a high conversion (HC) reset level, the second capacitive element may hold the signal level when the conversion efficiency is the high conversion efficiency as an HC signal level, the third capacitive element may hold the reset level when the conversion efficiency is the low conversion efficiency as a low conversion (LC) reset level, and the fourth capacitive element may hold the signal level when the conversion efficiency is the low conversion efficiency as an LC signal level. This configuration brings an effect of enabling the dual-gain drive and the global shutter operation.

Furthermore, according to the first aspect, an analog to digital conversion unit that converts each of the HC reset level, the HC signal level, the LC reset level, and the LC signal level into a digital signal, a correlated double sampling processing unit that calculates a difference between the digital signal corresponding to the HC reset level and the digital signal corresponding to the HC signal level as HC difference data, and calculates a difference between the digital signal corresponding to the LC reset level and the digital signal corresponding to the LC signal level as LC difference data, an illuminance determination unit that determines whether or not illuminance is higher than a predetermined value on the basis of the HC difference data and generates a determination result, and a post-stage selector that selects one of the HC difference data or the LC difference data on the basis of the determination result may be further provided. This configuration brings about an effect of selecting the conversion efficiency according to illuminance.

Furthermore, according to the first aspect, the post-stage node may include an HC-side post-stage node and an LC-side post-stage node, the selection circuit may include an HC-side selection circuit that selects one of their respective another ends of the first and second capacitive elements and connects the selected another end to the HC-side post-stage node, and an LC-side selection circuit that selects one of their respective another ends of the third and fourth capacitive elements and connects the selected another end to the LC-side post-stage node, and the post-stage circuit may include an HC-side post-stage circuit that reads the HC signal level and the HC reset level from the HC-side post-stage node and outputs the HC signal level and the HC reset level through an HC-side vertical signal line, and an LC-side post-stage circuit that reads the LC signal level and the LC reset level from the LC-side post-stage node and outputs the LC signal level and the LC reset level through an LC-side vertical signal line. This configuration brings about an effect of simultaneously reading the HC-side signal and the LC-side signal.

Furthermore, according to the first aspect, a pre-stage selector that selects one of a potential of the HC-side vertical signal line or a potential of the LC-side vertical signal line in accordance with a predetermined latch output signal and outputs the selected potential as an output potential, a comparator that compares the output potential with a predetermined reference voltage and outputs a comparison result, a latch circuit that generates the latch output signal on the basis of the comparison result, and a counter that counts a count value over a period until the comparison result is inverted may be further provided. This configuration brings about an effect of determining illuminance on the basis of the analog signal.

Furthermore, according to the first aspect, fifth, sixth, seventh, and eighth capacitive elements may be further provided, the pair of floating diffusion layers may include a pair of first floating diffusion layers in a first pixel and a pair of second floating diffusion layers in a second pixel, the conversion efficiency control transistor may include a first conversion efficiency control transistor in the first pixel and a second conversion efficiency control transistor in the second pixel, the pre-stage circuit may include a first pre-stage circuit in which the pair of first floating diffusion layers and the first conversion efficiency control transistor are arranged, and a second pre-stage circuit in which the pair of second floating diffusion layers and the second conversion efficiency control transistor are arranged, the first, second, third, and fourth capacitive elements may have their respective one ends commonly connected to the first pre-stage circuit, and the fifth, sixth, seventh, and eighth capacitive elements may have their respective one ends commonly connected to the second pre-stage circuit. This configuration brings about an effect of sharing the circuits after the selection circuit by two pixels.

Furthermore, according to the first aspect, the pre-stage circuit may be provided in a first chip, and the first, second, third, and fourth capacitive elements, the selection circuit, and the post-stage circuit may be provided in a second chip. This configuration brings about an effect of facilitating pixel miniaturization.

Furthermore, according to the first aspect, an analog to digital converter that sequentially converts the reset level and the signal level into a digital signal may be further provided, and the analog to digital converter may be provided in a third chip. This configuration brings about an effect of facilitating pixel miniaturization.

Furthermore, a second aspect of the present technology is an imaging device including a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged, first, second, third, and fourth capacitive elements having their respective one ends commonly connected to the pre-stage circuit, a selection circuit that selects one of their respective another ends of the first, second, third, and fourth capacitive elements and connects the selected another end to a predetermined post-stage node, a post-stage circuit that reads, via the post-stage node, a reset level obtained by amplifying the voltage when the pair of floating diffusion layers is initialized and a signal level obtained by amplifying the voltage when the charges are transferred, and a signal processing circuit that processes the reset level and the signal level. This configuration brings about an effect of improving image quality for the imaging device.

BRIEF DESCRIPTION OF DRAWINGS

FIG. 4 is a diagram for describing features of dual-gain drive in the first embodiment of the present technology.

FIG. 23 is a diagram depicting an example of an operation of a latch circuit in the second embodiment of the present technology.

MODE FOR CARRYING OUT THE INVENTION

Modes for carrying out the present technology (hereinafter referred to as embodiments) are hereinafter described. The description will be given in the following order.
1. First Embodiment (example where four capacitive elements are arranged for each pixel)
2. Second Embodiment (example where four capacitive elements are arranged for each pixel to reduce the frequency of AD conversion)
3. Application Example to Mobile Body 1. First Embodiment

[Configuration Example of Imaging Device]

Figure 1:
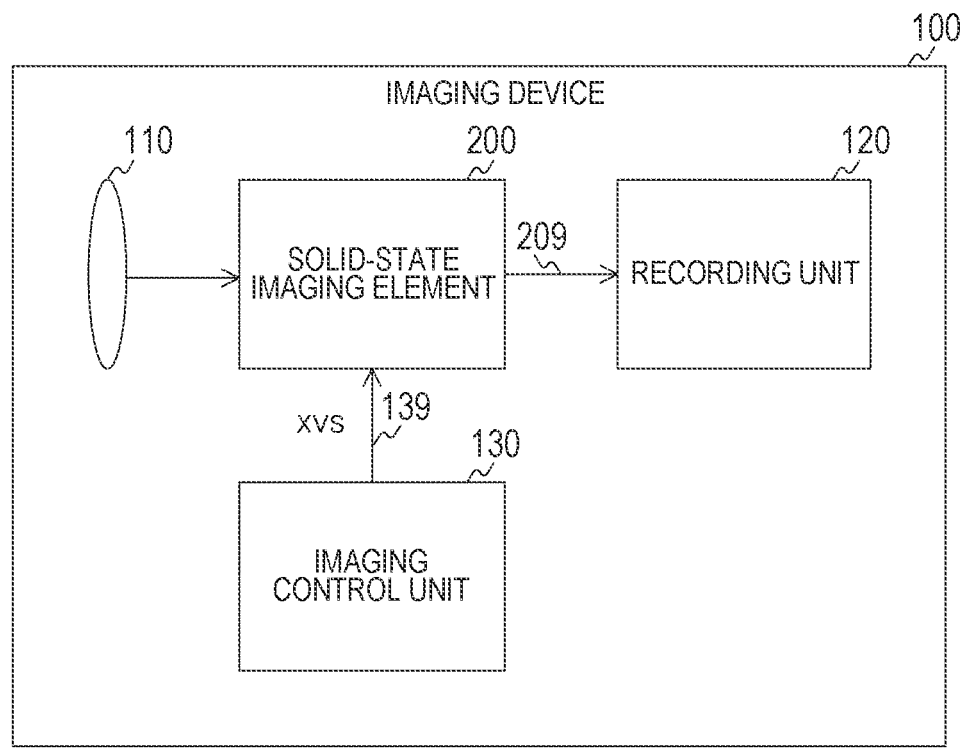
FIG. 1 is a block diagram depicting a configuration example of an imaging device in a first embodiment of the present technology.

FIG. 1 is a block diagram depicting a configuration example of an imaging device 100 in a first embodiment of the present technology. The imaging device 100 is a device that captures image data, and includes an imaging lens 110, a solid-state imaging element 200, a recording unit 120, and an imaging control unit 130. As the imaging device 100, a digital camera, and an electronic device (a smartphone, a personal computer, or the like) having an imaging function are assumed.

The solid-state imaging element 200 captures the image data under control of the imaging control unit 130. The solid-state imaging element 200 supplies the image data to the recording unit 120 via a signal line 209.

The imaging lens 110 condenses light and guides the light to the solid-state imaging element 200. The imaging control unit 130 controls the solid-state imaging element 200 to capture the image data. For example, the imaging control unit 130 supplies an imaging control signal including a vertical synchronization signal XVS to the solid-state imaging element 200 via a signal line 139. The recording unit 120 records the image data.

Here, the vertical synchronization signal XVS is a signal indicating imaging timing, and a periodic signal of a constant frequency (such as 60 hertz) is used as the vertical synchronization signal XVS.

Note that although the imaging device 100 records the image data, the image data may be transmitted to the outside of the imaging device 100. In this case, an external interface for transmitting the image data is further provided. Alternatively, the imaging device 100 may further display the image data. In this case, a display section is further provided.

[Configuration Example of Solid-State Imaging Element]

Figure 2:
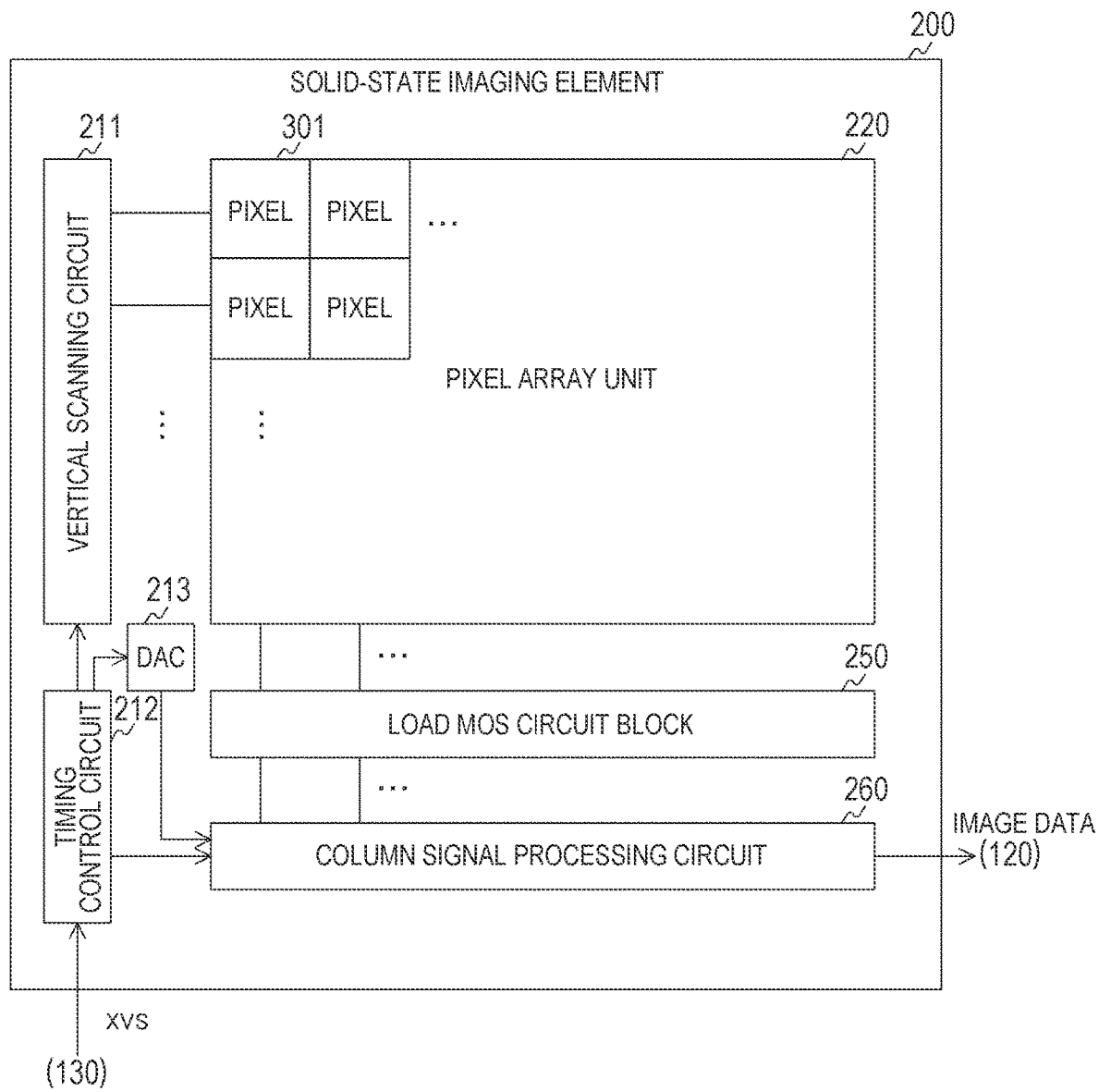
FIG. 2 is a block diagram depicting a configuration example of a solid-state imaging element in the first embodiment of the present technology.

FIG. 2 is a block diagram depicting a configuration example of the solid-state imaging element 200 in the first embodiment of the present technology. The solid-state imaging element 200 includes a vertical scanning circuit 211, a pixel array unit 220, a timing control circuit 212, a digital to analog converter (DAC) 213, a load MOS circuit block 250, and a column signal processing circuit 260. In the pixel array unit 220, a plurality of pixels such as pixels 301 is arranged in a two-dimensional lattice pattern. Furthermore, each circuit in the solid-state imaging element 200 is provided in, for example, a single semiconductor chip.

The timing control circuit 212 controls operation timing of each of the vertical scanning circuit 211, the DAC 213, and the column signal processing circuit 260 in synchronization with the vertical synchronization signal XVS from the imaging control unit 130.

The DAC 213 generates a sawtooth wave-like ramp signal by digital-to-analog (DA) conversion. The DAC 213 supplies the generated ramp signal to the column signal processing circuit 260.

The vertical scanning circuit 211 sequentially selects and drives rows, and outputs analog pixel signals. The pixel photoelectrically converts incident light to generate an analog pixel signal. This pixel supplies the pixel signal to the column signal processing circuit 260 via the load MOS circuit block 250.

In the load MOS circuit block 250, a MOS transistor that supplies a constant current is provided for each column.

The column signal processing circuit 260 performs signal processing such as analog to digital (AD) conversion processing and correlated double sampling (CDS) processing on the pixel signal for each column. The column signal processing circuit 260 supplies the image data including the processed signals to the recording unit 120. Note that the column signal processing circuit 260 is an example of a signal processing circuit described in the claims.

[Configuration Example of Pixel]

Figure 3:
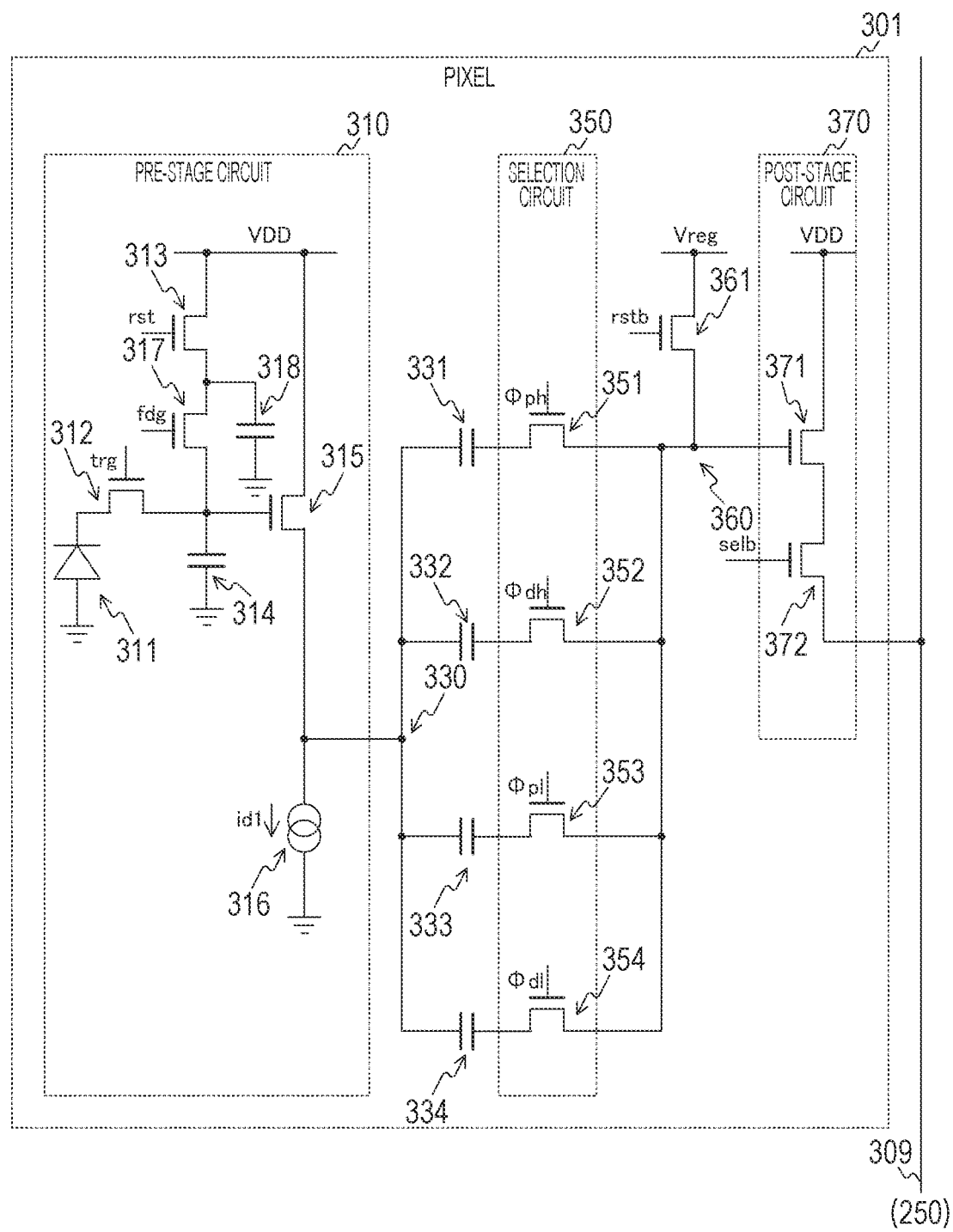
FIG. 3 is a circuit diagram depicting a configuration example of a pixel in the first embodiment of the present technology.

FIG. 3 is a circuit diagram depicting a configuration example of the pixel 301 in the first embodiment of the present technology. In the pixel 301, a pre-stage circuit 310, capacitive elements 331 to 334, a selection circuit 350, a post-stage reset transistor 361, and a post-stage circuit 370 are arranged. As the capacitive elements 331 to 334, for example, a capacitor having a metal-insulator-metal (MIM) structure is used. Note that the capacitive elements 331 to 334 are examples of first, second, third, and fourth capacitive elements described in the claims.

The pre-stage circuit 310 sequentially generates a reset level and a signal level, and causes the capacitive elements 331 and 332 to hold the reset level and the signal level. The pre-stage circuit 310 includes a photoelectric conversion element 311, a transfer transistor 312, a floating diffusion (FD) reset transistor 313, an FD 314, a pre-stage amplification transistor 315, and a current source transistor 316. Furthermore, the pre-stage circuit 310 further includes a conversion efficiency control transistor 317 and an FD 318.

The photoelectric conversion element 311 generates charges by the photoelectric conversion. The transfer transistor 312 transfers charges from the photoelectric conversion element 311 to at least one of the FDs 314 and 318 in accordance with a transfer signal trg from the vertical scanning circuit 211.

The FD reset transistor 313 extracts the charges from the FDs 314 and 318 to initialize the FDs 314 and 318 in accordance with an FD reset signal rst from the vertical scanning circuit 211. The FDs 314 and 318 accumulate charges, and generate a voltage corresponding to a charge amount.

The pre-stage amplification transistor 315 amplifies the level of the voltage of each of the FDs 314 and 318, and outputs the amplified voltage to a pre-stage node 330.

The conversion efficiency control transistor 317 opens and closes a path between the FD 314 and the FD 318 in accordance with a control signal fdg from the vertical scanning circuit 211. In a case where the conversion efficiency control transistor 317 turns on, the FD 314 and the FD 318 are connected, and their combined capacity is larger than the capacity of the FD 314. Therefore, the conversion efficiency with which charges are converted into a voltage decreases as compared with a case where only the FD 314 is provided. The value of the conversion efficiency at this time is hereinafter referred to as "low conversion efficiency" or "low conversion (LC)".

On the other hand, in a case where the conversion efficiency control transistor 317 turns off, charges are converted into a voltage only by the FD 314, and the value of the conversion efficiency is higher than the LC. The value of the conversion efficiency at this time is hereinafter referred to as "high conversion efficiency" or "high conversion (HC)".

The FD reset transistor 313 and the pre-stage amplification transistor 315 have their respective drains connected to a power supply voltage VDD. The current source transistor 316 is connected to the source of the pre-stage amplification transistor 315. The current source transistor 316 supplies a current id1 under the control of the vertical scanning circuit 211.

The capacitive elements 331 to 334 have their respective one ends commonly connected to the pre-stage node 330, and have their respective other ends connected to the selection circuit 350.

The selection circuit 350 includes selection transistors 351 to 354. The selection transistor 351 opens and closes a path between the capacitive element 331 and the post-stage node 360 in accordance with a selection signal Φph from the vertical scanning circuit 211. The selection transistor 352 opens and closes a path between the capacitive element 332 and the post-stage node 360 in accordance with a selection signal Φdh from the vertical scanning circuit 211.

The selection transistor 353 opens and closes a path between the capacitive element 333 and the post-stage node 360 in accordance with a selection signal Φpl from the vertical scanning circuit 211. The selection transistor 354 opens and closes a path between the capacitive element 334 and the post-stage node 360 in accordance with a selection signal Φdl from the vertical scanning circuit 211.

The post-stage reset transistor 361 initializes the level of the post-stage node 360 to a predetermined potential Vreg in accordance with a post-stage reset signal rstb from the vertical scanning circuit 211. A potential different from the power supply voltage VDD (for example, a potential lower than VDD) is set as the potential Vreg.

The post-stage circuit 370 includes the post-stage amplification transistor 371, and the post-stage selection transistor 372. The post-stage amplification transistor 371 amplifies the level of the post-stage node 360. The post-stage selection transistor 372 outputs a signal at the level amplified by the post-stage amplification transistor 371 to a vertical signal line 309 as a pixel signal in accordance with a post-stage selection signal selb from the vertical scanning circuit 211.

Note that, for example, n-channel metal oxide semiconductor (nMOS) transistors are used as various transistors (transfer transistor 312 and the like) in the pixel 301.

The vertical scanning circuit 211 supplies a high-level FD reset signal rst, a high-level control signal fdg, and a high-level transfer signal trg to all the rows at the start of the exposure. Therefore, the photoelectric conversion element 311 is initialized. Hereinafter, this control is referred to as "PD reset".

Then, the vertical scanning circuit 211 supplies the high-level FD reset signal rst over the pulse period while setting the control signal fdg, the post-stage reset signal rstb, and the selection signal Φpl to the high level for all the rows immediately before the end of the exposure. Therefore, the LC is set, and the FDs 314 and 318 are initialized. This control is hereinafter referred to as "FD reset". A level corresponding to the level of the FD (314 and 318) at this time is held in the capacitive element 333.

Subsequently, the vertical scanning circuit 211 sets the selection signal Φph to the high level while setting the control signal fdg to the low level for all the rows. Therefore, the HC is set, and the level corresponding to the level of the FD 314 is held in the capacitive element 331.

The levels of the FDs 314 and 318 at the time of the FD reset and levels (the levels held in the capacitive elements 331 and 333 and the level of the vertical signal line 309) corresponding to the levels are hereinafter collectively referred to as "P-phase" or "reset level". Furthermore, the reset level at the time of the HC setting is hereinafter referred to as "HC reset level", and the reset level at the time of the LC setting is hereinafter referred to as "LC reset level".

At the end of the exposure, the vertical scanning circuit 211 supplies the high-level transfer signal trg over the pulse period while setting the control signal fdg to the low level and the post-stage reset signal rstb to the high level for all rows. Therefore, the HC is set, and signal charges corresponding to the exposure amount are transferred to the FD 314. Then, a high-level selection signal Φdh is supplied to all the rows, and a level corresponding to the level of the FD 314 at this time is held in the capacitive element 332.

Next, the high-level control signal fdg and a high-level selection signal Φdl are supplied to all the rows. Therefore, the LC is set, and a level corresponding to the level of the FD (314 and 318) at this time is held in the capacitive element 334.

The levels of the FDs 314 and the FD 318 at the time of the signal charge transfer and levels (the levels held in the capacitive elements 332 and 334 and the level of the vertical signal line 309) corresponding to the levels are hereinafter collectively referred to as "D-phase" or "signal level". Furthermore, the signal level at the time of the HC setting is hereinafter referred to as "HC signal level", and the reset level at the time of the LC setting is hereinafter referred to as "LC signal level".

The exposure control of simultaneously starting and ending the exposure for all the pixels in this manner is called a global shutter method. By this exposure control, the pre-stage circuit 310 of all the pixels sequentially generates the LC reset level, the HC reset level, the HC signal level, and the LC signal level. The LC reset level is held in the capacitive element 333, and the HC reset level is held in the capacitive element 331. The HC signal level is held in the capacitive element 332, and the LC signal level is held in the capacitive element 334.

After the end of the exposure, the vertical scanning circuit 211 sequentially selects a row and sequentially outputs the HC reset level, the HC signal level, the LC reset level, and the LC signal level of the row. At the time of the reading, the vertical scanning circuit 211 supplies the high-level post-stage reset signal rstb over the pulse period to the selected row over the pulse period while setting the post-stage selection signal selb, the FD reset signal rst, and the control signal fdg of the selected row to the high level.

Then, the vertical scanning circuit 211 supplies the high-level selection signal Φph over a predetermined period. Therefore, the capacitive element 331 is connected to the post-stage node 360, and the HC reset level is read.

Next, the vertical scanning circuit 211 supplies the high-level selection signal Φdh over a predetermined period. Therefore, the capacitive element 332 is connected to the post-stage node 360, and the HC signal level is read.

Then, the vertical scanning circuit 211 supplies the high-level selection signal Φpl over a predetermined period. Therefore, the capacitive element 333 is connected to the post-stage node 360, and the LC reset level is read.

Next, the vertical scanning circuit 211 supplies the high-level selection signal Φdl over a predetermined period. Therefore, the capacitive element 334 is connected to the post-stage node 360, and the LC signal level is read.

By the above-described read control, the selection circuit 350 of the selected row performs control to disconnect the capacitive elements 331 to 334 from the post-stage node 360 and control to sequentially select and connect the capacitive elements 331 to 334 to the post-stage node 360.

Furthermore, when the capacitive elements 331 to 334 are disconnected from the post-stage node 360, the post-stage reset transistor 361 of the selected row initializes the level of the post-stage node 360.

Furthermore, the post-stage circuit 370 of the selected row sequentially reads the HC reset level, the HC signal level, the LC reset level, and the LC signal level from the capacitive elements 331 to 334 via the post-stage node 360, and outputs the HC reset level, the HC signal level, the LC reset level, and the LC signal level to the vertical signal line 309.

FIG. 4 is a diagram for describing features of dual-gain drive in the first embodiment of the present technology. Here, when a ratio of a voltage (that is, the FD output) to a signal charge amount to be transferred (that is, the FD input) is defined as a gain, the gain increases in a case of the high conversion efficiency (HC), and the gain decreases in a case of the low conversion efficiency (LC).

In a case where the conversion efficiency control transistor 317 and the FD 318 are provided, the gain can be controlled in two levels by means of the control of the conversion efficiency. On the other hand, in a case where neither the conversion efficiency control transistor 317 nor the FD 318 is provided, the gain is a fixed value. The former pixel drive is referred to as "dual-gain drive", and the latter pixel drive is referred to as "single-gain drive".

As illustrated in the drawing, in the single-gain drive, in a case where the conversion efficiency is fixed at relatively low efficiency, an amount Qs of signal charges that can be converted increases, but input referred noise increases, which is disadvantageous under low illuminance. Furthermore, in a case where the conversion efficiency is fixed at relatively high efficiency, the input referred noise decreases, but the Qs decreases, which is disadvantageous under high illuminance. As described above, in the single-gain drive, it is difficult to achieve both a decrease in the input referred noise and an increase in the Qs.

On the other hand, in the dual-gain drive, lowering the gain under high illuminance and increasing the gain under low illuminance make it possible to achieve both a decrease in the input referred noise and an increase in the Qs (in other words, an improvement in sensitivity). Therefore, the image quality of the image data can be improved.

[Configuration Example of Column Signal Processing Circuit]

Figure 5:
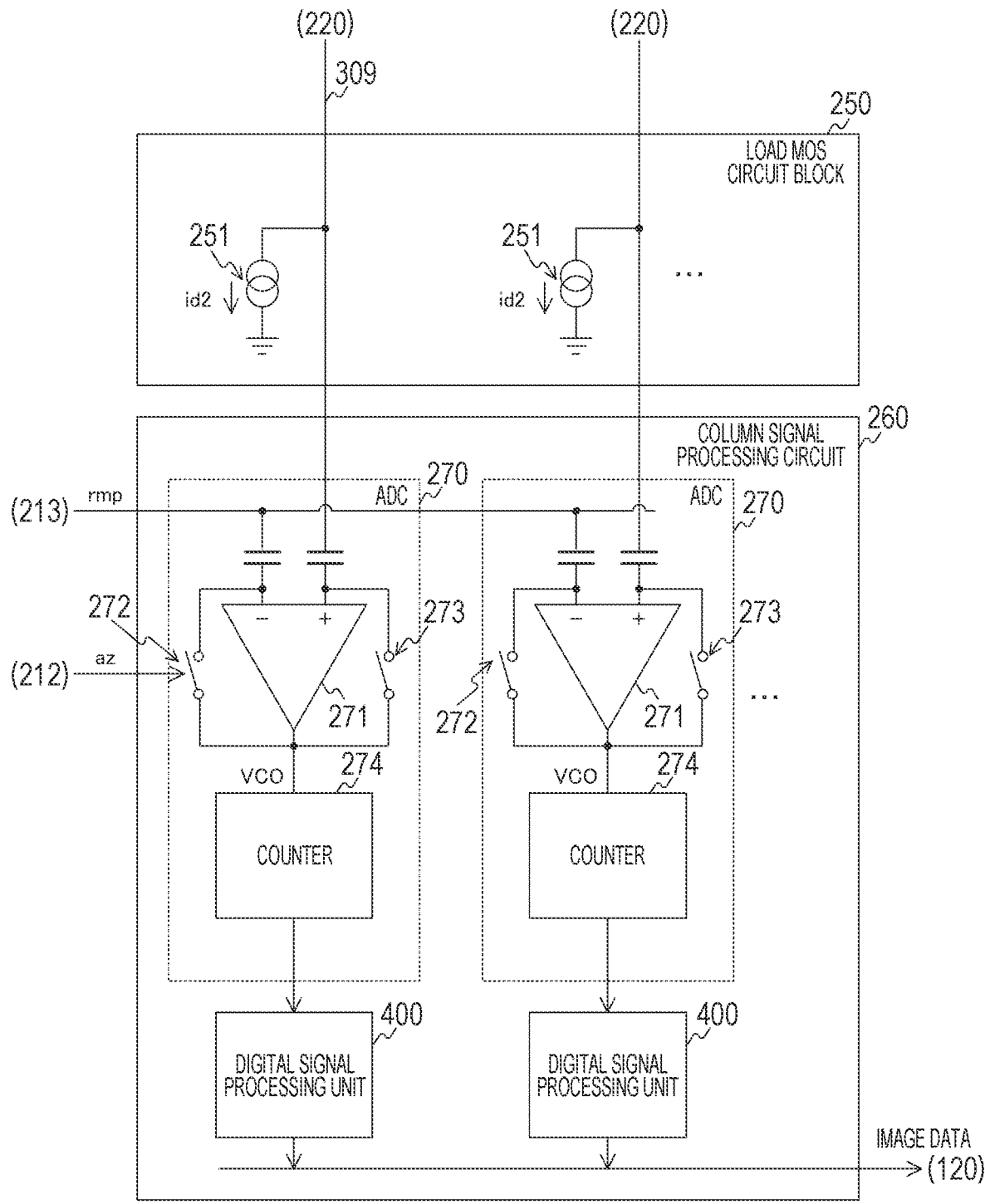
FIG. 5 is a block diagram depicting a configuration example of a column signal processing circuit in the first embodiment of the present technology.

FIG. 5 is a block diagram depicting a configuration example of the column signal processing circuit 260 in the first embodiment of the present technology.

In the load MOS circuit block 250, the vertical signal line 309 is wired for each column. In a case where the number of columns is I (I is an integer), I vertical signal lines 309 are wired. Furthermore, a load MOS transistor 251 that supplies a constant current id2 is connected to each of the vertical signal lines 309.

In the column signal processing circuit 260, an ADC 270 and a digital signal processing unit 400 are arranged for each column.

The ADC 270 converts each of the HC reset level, the HC signal level, the LC reset level, and the LC signal level from the corresponding column into a digital signal using a ramp signal rmp from the DAC 213. The ADC 270 includes a comparator 271, auto-zero switches 272 and 273, and a counter 274.

The comparator 271 compares the reset level and the signal level from the vertical signal line 309 with a reference voltage that is a level of the ramp signal rmp. The comparator 271 supplies a comparison result VCO to the counter 274.

The auto-zero switch 272 short-circuits an inverting input terminal (−) and an output terminal of the comparator 271 in accordance with an auto-zero signal az from the timing control circuit 212. The auto-zero switch 273 short-circuits a non-inverting input terminal (+) and the output terminal of the comparator 271 in accordance with the auto-zero signal az from the timing control circuit 212.

The counter 274 counts a count value over a period until the comparison result VCO is inverted. The counter 274 supplies a digital signal indicating the count value to the digital signal processing unit 400.

The digital signal processing unit 400 performs CDS processing, illuminance determination, digital gain correction, and the like on the digital signal. Details of such processing will be described later. The digital signal processing unit 400 supplies the processed data to the recording unit 120.

[Configuration Example of Digital Signal Processing Unit]

Figure 6:
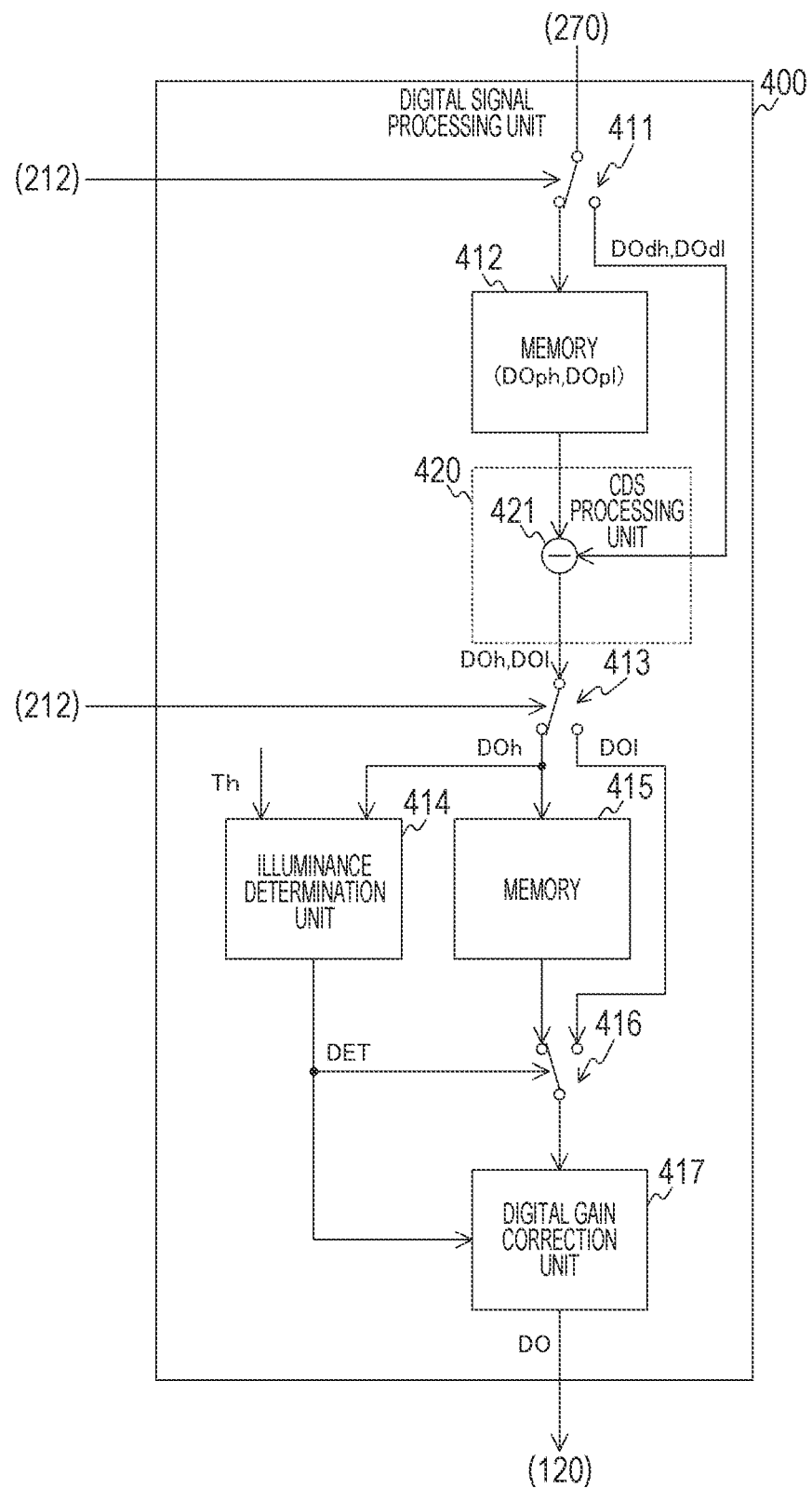
FIG. 6 is a block diagram depicting a configuration example of a digital signal processing unit in the first embodiment of the present technology.

FIG. 6 is a block diagram depicting a configuration example of the digital signal processing unit 400 in the first embodiment of the present technology. The digital signal processing unit 400 includes a selector 411, a memory 412, a CDS processing unit 420, a selector 413, an illuminance determination unit 414, a memory 415, a selector 416, and a digital gain correction unit 417.

The selector 411 switches the output destination of the digital signal from the ADC 270 under the control of the timing control circuit 212. Here, it is assumed that a digital signal corresponding to the HC reset level is denoted as DOph and a digital signal corresponding to the HC signal level is denoted as DOdh. A digital signal corresponding to the LC reset level is denoted as DOpl, and a digital signal corresponding to the LC signal level is denoted as DOdl.

The selector 411 outputs the digital signals DOph and DOpl corresponding to the reset level to the memory 412 to cause the memory 412 to hold the digital signals DOph and DOpl, and outputs the digital signals DOdh and DOdl corresponding to the signal level to the CDS processing unit 420.

The CDS processing unit 420 performs CDS processing of obtaining a difference between the reset level and the signal level. The CDS processing unit 420 includes a subtractor 421.

The subtractor 421 obtains a difference between the digital signal DOph corresponding to the HC reset level and the digital signal DOdh corresponding to the HC signal level, and supplies the difference to the selector 413 as a digital signal DOh indicating a net HC signal level. Furthermore, the subtractor 421 obtains a difference between the digital signal DOpl corresponding to the LC reset level and the digital signal DOdl corresponding to the LC signal level, and supplies the difference to the selector 413 as a digital signal DOl indicating a net LC signal level.

The selector 411 switches the output destination of the digital signal from the subtractor 421 under the control of the timing control circuit 212. The selector 411 supplies the digital signal DOh (HC signal level) at the time of the HC setting to the illuminance determination unit 414 and the memory 415. Furthermore, the selector 411 supplies the digital signal DOl (LC signal level) at the time of the LC setting to the selector 416.

The illuminance determination unit 414 determines whether or not illuminance is higher than a predetermined value on the basis of the digital signal DOh (HC signal level) at the time of the HC setting. The illuminance determination unit 414 compares the digital signal DOh with a predetermined threshold Th, and determines that illuminance is high illuminance that is higher than the predetermined value in a case where the digital signal DOh is higher than the threshold Th. On the other hand, in a case where the digital signal DOh is less than or equal to the threshold Th, it is determined that illuminance is low illuminance that is less than or equal to the predetermined value. The illuminance determination unit 414 supplies a determination result DET to the selector 416 and the digital gain correction unit 417.

The selector 416 selects one of the digital signal DOh (HC signal level) at the time of the HC setting or the digital signal DOl (LC signal level) at the time of the LC setting in accordance with the determination result DET. In a case where the determination result DET indicates the high illuminance, the selector 416 selects the digital signal DOl at the time of the LC setting from the selector 413 and supplies the digital signal DOl to the digital gain correction unit 417. On the other hand, in a case where the determination result DET indicates the low illuminance, the selector 416 selects the digital signal DOh at the time of the HC setting held in the memory 415 and supplies the digital signal DOh to the digital gain correction unit 417. Note that the selector 416 is an example of a post-stage selector described in the claims.

The digital gain correction unit 417 corrects the signal level as necessary. In a case where the determination result DET indicates the high illuminance, the digital gain correction unit 417 outputs, without correcting, the digital signal DOl as it is to the recording unit 120 as pixel data DO. On the other hand, in a case where the determination result DET indicates the low illuminance, the digital gain correction unit 417 corrects the digital signal DOh to make the gain equal to the value at the time of the LC setting, and outputs the corrected digital signal DOh to the recording unit 120 as the pixel data DO.

Note that part or all of the processing of the digital signal processing unit 400 can also be performed outside the solid-state imaging element 200. For example, at least part of the processing of the digital signal processing unit 400 can be performed by a digital signal processing (DSP) circuit.

Furthermore, the CDS processing is performed in the post-stage of the ADC 270, or alternatively, the ADC 270 can perform the CDS processing. In this case, it is only required that the counter 274 in the ADC 270 change the counting operation between the time of the P-phase conversion and the time of the D-phase conversion. For example, it is only required that the counter 274 perform down-counting at the time of the P-phase conversion and up-counting at the time of the D-phase conversion.

Furthermore, the digital signal processing unit 400 determines illuminance on the basis of the digital signal DOh (HC signal level) after the CDS processing, but can also determine illuminance on the basis of the digital signal DOdh (HC signal level) before the CDS processing.

[Operation Example of Solid-State Imaging Element]

Figure 7:
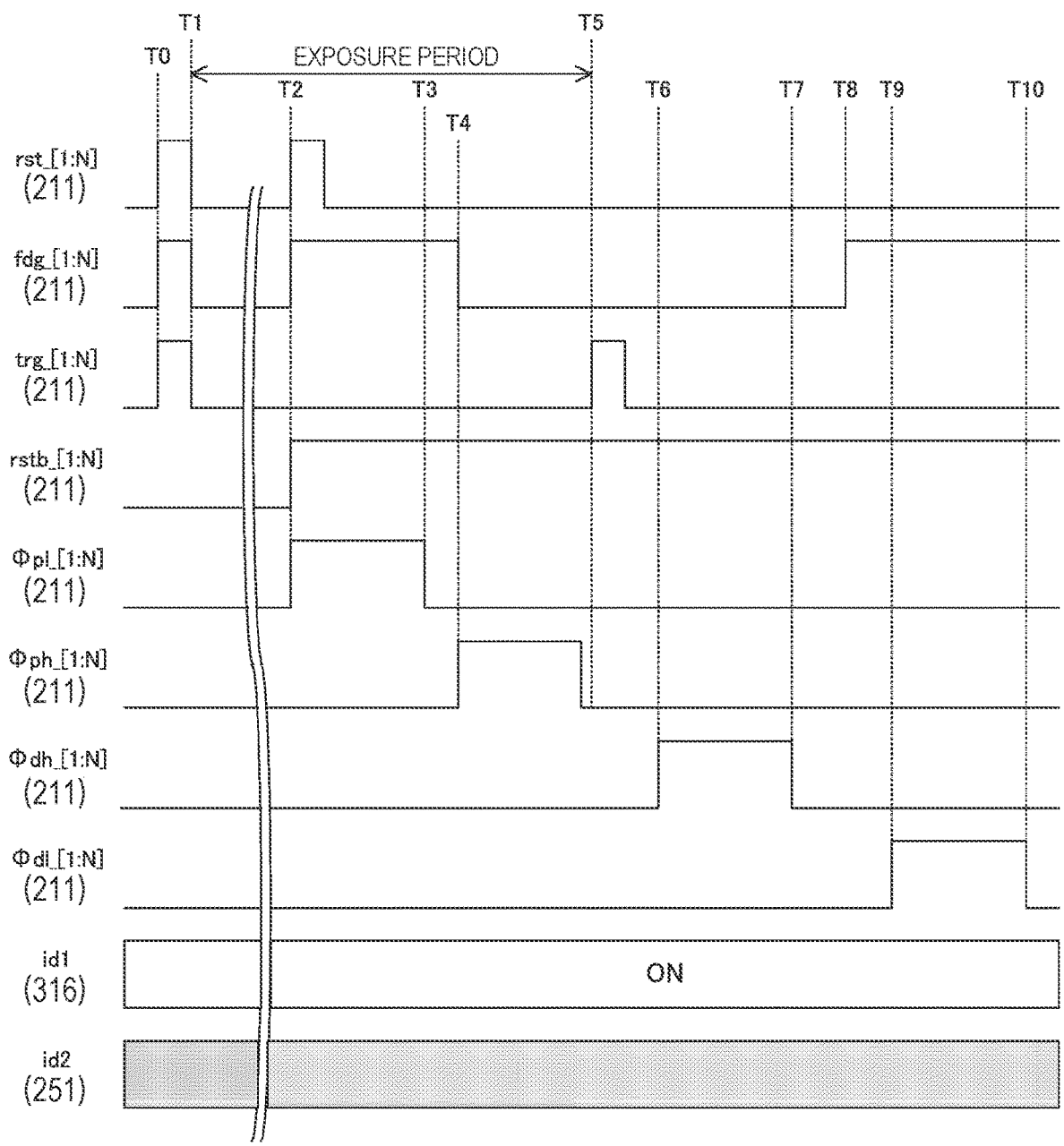
FIG. 7 is a timing chart depicting an example of a global shutter operation in the first embodiment of the present technology.

FIG. 7 is a timing chart depicting an example of a global shutter operation in the first embodiment of the present technology. The vertical scanning circuit 211 supplies the high-level FD reset signal rst, the high-level control signal fdg, and the high-level transfer signal trg to all the rows (in other words, all pixels) over a period from timing T0 immediately before the start of the exposure to timing T1 after the pulse period elapses. Therefore, all the pixels are PD reset, and the exposure simultaneously starts in all the rows.

Here, rst_[n], fdg_[n], trg_[n], rstb_[n], Φpl_[n], Φph_[n], Φdh_[n], and Φdl_[n] in the drawing indicate signals to pixels in the n-th row among the N rows. N is an integer indicating the total number of rows, and n is an integer from 1 to N.

At timing T2 immediately before the end of the exposure, the vertical scanning circuit 211 sets the control signal fdg, the post-stage reset signal rstb, and the selection signal Φpl of all the rows to the high level. Furthermore, the vertical scanning circuit 211 supplies the high-level FD reset signal rst to all the rows over the pulse period from timing T2. Therefore, all the pixels are FD reset.

Then, the vertical scanning circuit 211 sets the selection signal Φpl of all the rows to the low level at timing T3. The LC reset level is sampled and held during a period from timing T2 to timing T3.

Subsequently, the vertical scanning circuit 211 sets the control signal fdg of all the rows to the low level at timing T4, and sets the selection signal Φph of all the rows to the high level over a period from timing T4 to immediately before T5. Therefore, the HC reset level is sampled and held.

The vertical scanning circuit 211 supplies the high-level transfer signal trg to all the rows over the pulse period from timing T5. Therefore, the exposure of all the rows ends.

Then, the selection signal Φdh of all the rows is set to the high level over a period from timing T6 to timing T7. Therefore, the HC signal level is sampled and held.

Subsequently, the vertical scanning circuit 211 sets the control signal fdg of all the rows to the high level at timing T8, and sets the selection signal Φdl of all the rows to the high level over a period from timing T9 to timing T10. Therefore, the LC signal level is sampled and held.

Furthermore, at the time of the exposure, the vertical scanning circuit 211 turns on the current source transistor 316 of all the rows to supply a current id1, and turns off the load MOS transistor 251 of all the rows to stop a current id2.

Figure 8:
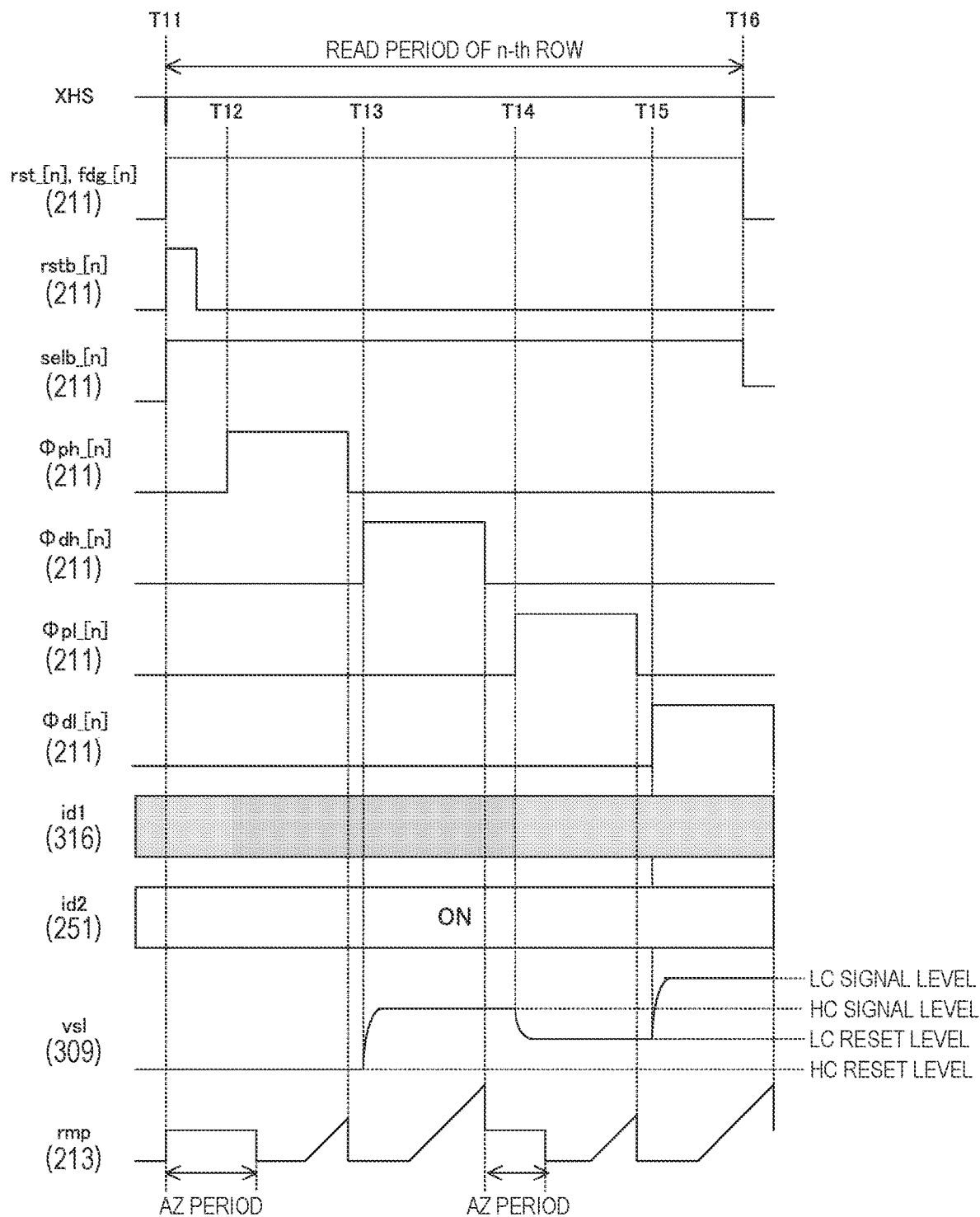
FIG. 8 is a timing chart depicting an example of a read operation of the pixel in the first embodiment of the present technology.

FIG. 8 is a timing chart depicting an example of a read operation of the pixel in the first embodiment of the present technology. The read operation in the drawing is performed in synchronization with a horizontal synchronization signal XHS. The horizontal synchronization signal XHS is a timing signal higher in frequency than the vertical synchronization signal XVS. A length of the read period of each row corresponds to a period of the horizontal synchronization signal XHS.

At timing T11 at the start of the reading of the n-th row, the vertical scanning circuit 211 sets the post-stage selection signal selb, the FD reset signal rst, and the control signal fdg of the n-th row to the high level, and supplies the high-level post-stage reset signal rstb to the n-th row over the pulse period. Therefore, the level of the post-stage node 360 is initialized. rstb_[n] in the drawing indicates a signal to pixels in the n-th row among the N rows.

Then, the vertical scanning circuit 211 supplies the high-level selection signal Φph to the n-th row over a period from timing T12 to immediately before timing T13. The DAC 213 gradually increases the voltage (that is, the reference voltage) of the ramp signal rmp over a certain period after the auto-zero period elapses. Therefore, the HC reset level is read through the vertical signal line 309.

The vertical scanning circuit 211 supplies the high-level selection signal Φdh to the n-th row over a period from timing T13 to immediately before timing T14. After the initialization of the reference voltage, the DAC 213 gradually increases the voltage of the ramp signal rmp over a certain period. Therefore, the HC signal level is read through the vertical signal line 309.

Subsequently, the vertical scanning circuit 211 supplies the high-level selection signal Φpl to the n-th row over a period from timing T14 to immediately before timing T15. The DAC 213 gradually increases the voltage of the ramp signal rmp over a certain period after the auto-zero period elapses. Therefore, the LC reset level is read through the vertical signal line 309.

The vertical scanning circuit 211 supplies the high-level selection signal Φdl to the n-th row over a period from timing T15 to timing T16 of the end of the reading of the n-th row. After the initialization of the reference voltage, the DAC 213 gradually increases the voltage of the ramp signal rmp over a certain period. Therefore, the LC signal level is read through the vertical signal line 309.

Furthermore, at the time of the reading, the vertical scanning circuit 211 turns off the current source transistor 316 of all the rows to stop the current id1, and turns on the load MOS transistor 251 of all the rows to supply the current id2.

As illustrated in the drawing, the solid-state imaging element 200 reads the signals in the order of the HC reset level (P-phase), the HC signal level (D-phase), the LC reset level (P-phase), and the LC signal level (D-phase), but the read order is not limited to such order.

Figure 9:
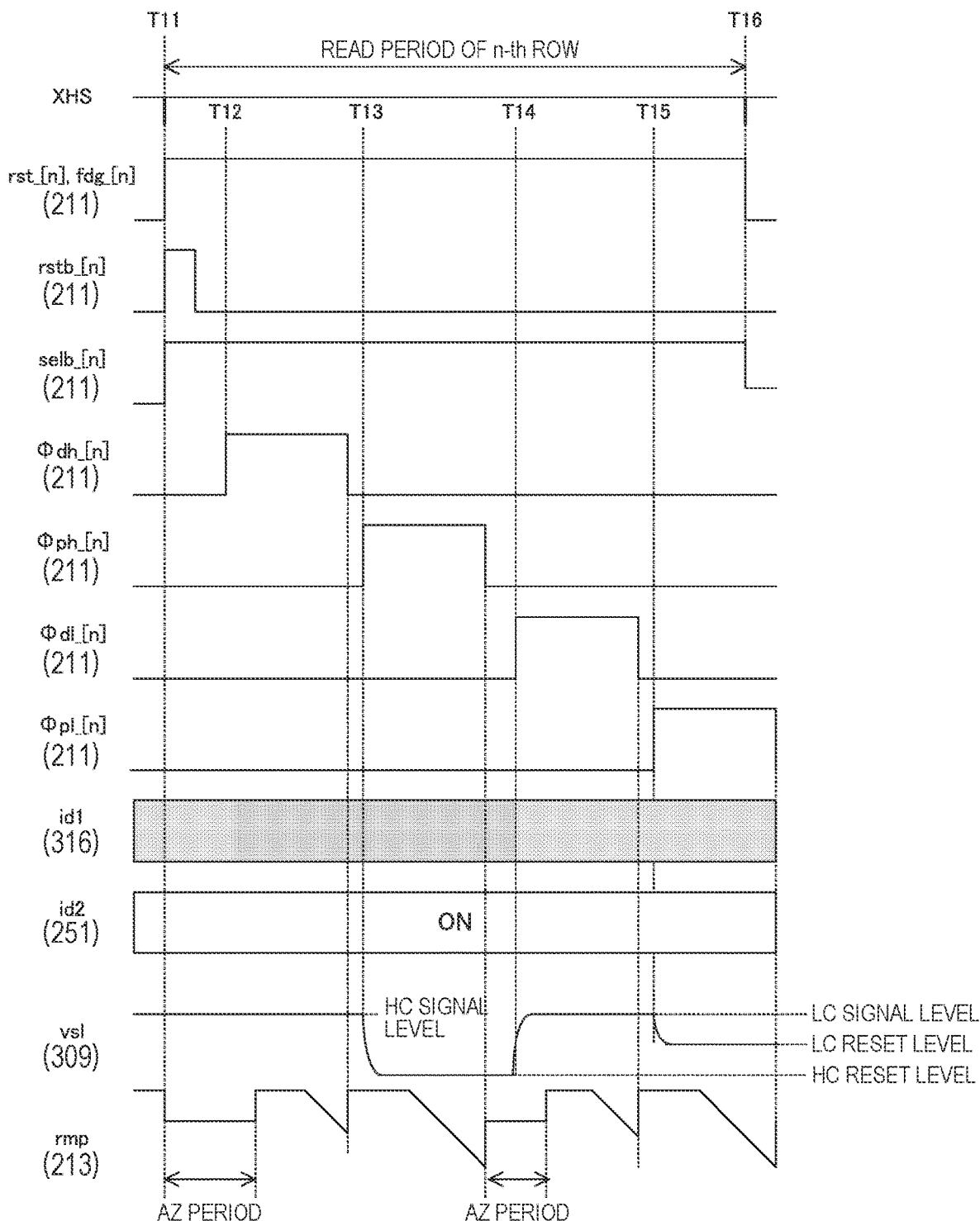
FIG. 9 is a timing chart depicting another example of the read operation of the pixel in the first embodiment of the present technology.

As illustrated in FIG. 9, the reading can be performed in the order of the D-phase, the P-phase, the D-phase, and the P-phase. In this case, as illustrated in the drawing, the slope of the slope of the ramp signal rmp is opposite to the slope in FIG. 8.

Figure 10:
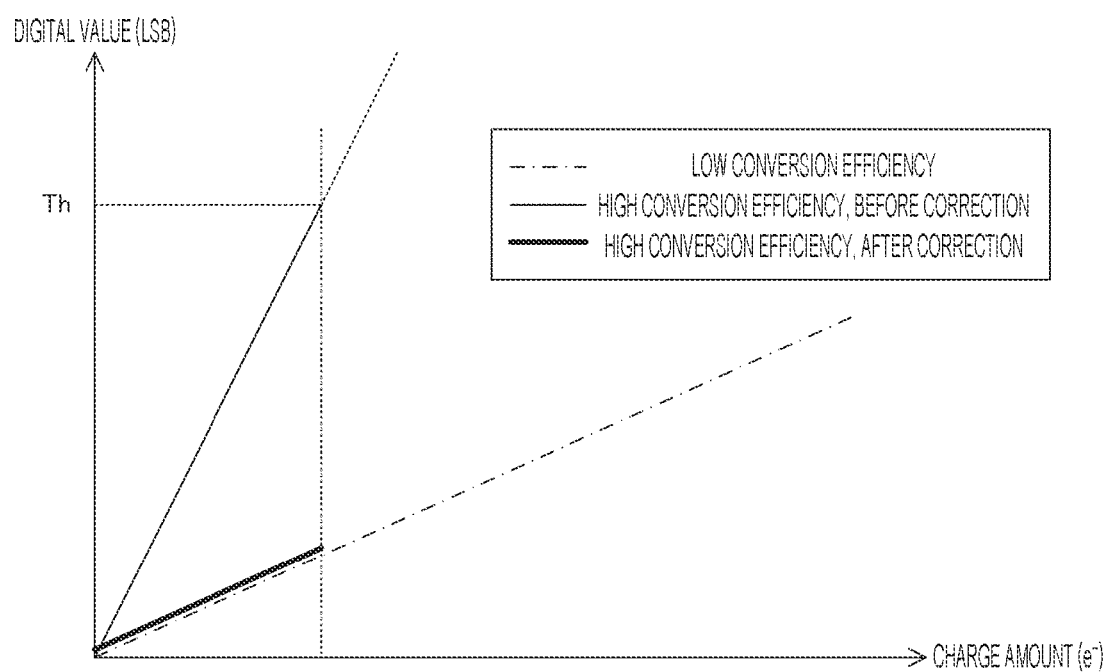
FIG. 10 is a diagram for describing a method for correcting a digital gain in the first embodiment of the present technology.

FIG. 10 is a diagram for describing a method for correcting a digital gain in the first embodiment of the present technology. The vertical axis in the drawing indicates the value of the digital signal in units of least significant bit (LSB). The horizontal axis in the drawing indicates the amount of signal charges.

Furthermore, a long dashed short dashed line indicates an example of a relationship between the digital value and the charge amount at the time of the low conversion efficiency (LC) setting. The slope of the long dashed short dashed line corresponds to the gain at the time of the LC setting. A thin practice indicates an example of a relationship between the digital value before correction and the charge amount at the time of the high conversion efficiency (HC) setting. The slope of the thin solid line corresponds to the gain before correction at the time of the HC setting.

Under the low illuminance, the digital signal processing unit 400 selects the digital signal DOh (HC signal level) at the time of the HC setting, and performs correction to make the gain equal to the value at the time of the LC setting. For example, with the gain at the time of the LC setting denoted as $G_L$ and the gain at the time of the HC setting denoted as $G_H$, the digital signal processing unit 400 multiplies the digital signal DOh at the time of the HC setting by $G_L/G_H$.

A thick practice in the drawing indicates an example of a relationship between the digital value after correction and the charge amount at the time of the HC setting. The slope of the thick solid line corresponds to the gain after correction at the time of the HC setting.

Figure 11:
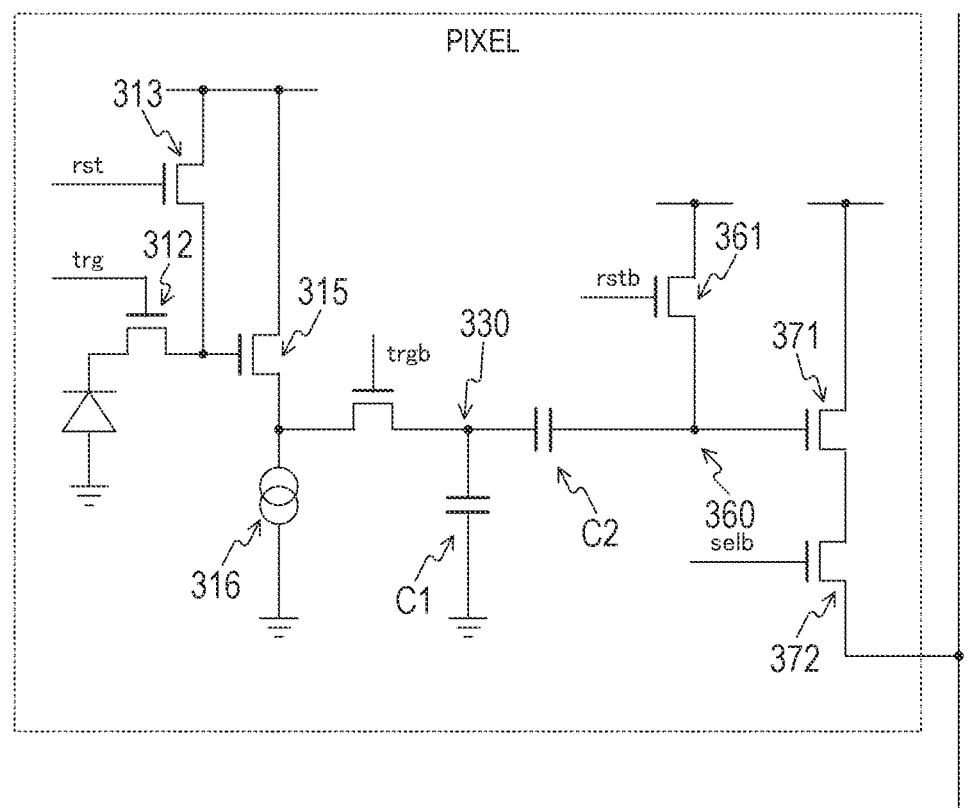
FIG. 11 is a circuit diagram depicting a configuration example of a pixel in a comparative example.

FIG. 11 is a circuit diagram depicting a configuration example of a pixel in a comparative example. In this comparative example, the selection circuit 350, the conversion efficiency control transistor 317, and the FD 319 are not provided, and a transfer transistor is inserted between the pre-stage node 330 and the pre-stage circuit. Furthermore, capacitors C1 and C2 are inserted instead of the capacitive elements 331 to 334. The capacitor C1 is inserted between the pre-stage node 330 and the ground terminal, and the capacitor C2 is inserted between the pre-stage node 330 and the post-stage node 360.

The exposure control and the read control of the pixel in this comparative example are described in FIG. 5.5.2 of "Jae-kyu Lee, et al., A 2.1e-Temporal Noise and −105 dB Parasitic Light Sensitivity Backside-Illuminated 2.3 μm-Pixel Voltage-Domain Global Shutter CMOS Image Sensor Using High-Capacity DRAM Capacitor Technology, ISSCC 2020", for example. In this comparative example, assuming that the capacitance value of each of the capacitors C1 and C2 is C, a level Vn of kTC noise at the time of exposure and reading is expressed by the following expression.

$$Vn=(3*kT/C)^{1/2} \qquad \text{Expression 1}$$

In the above expression, k is a Boltzmann constant, and the unit is, for example, Joule per Kelvin (J/K). T is an absolute temperature, and the unit is, for example, Kelvin (K). Furthermore, the unit of Vn is, for example, volt (V), and the unit of C is, for example, farad (F).

Figure 12:
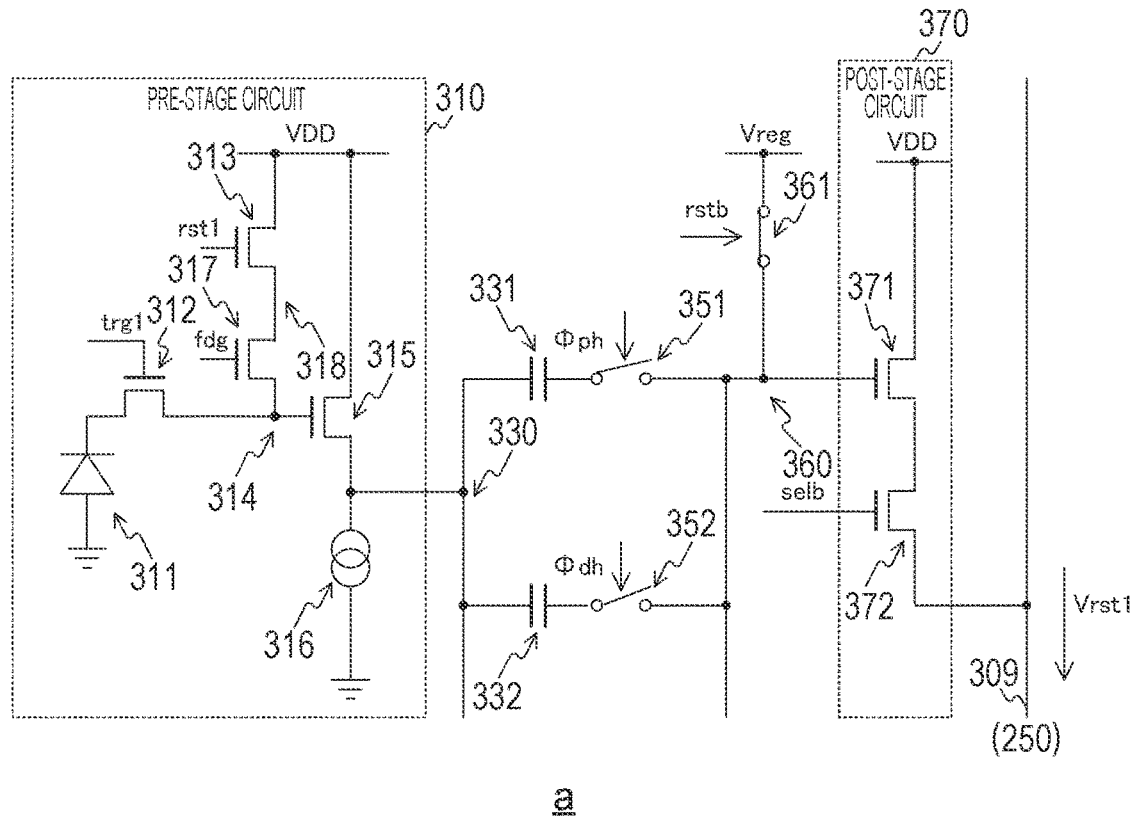
FIG. 12 is a diagram depicting an example of states of the pixel at the time of initialization of a post-stage node and at the time of reading a reset level in the first embodiment of the present technology.
Figure 12:
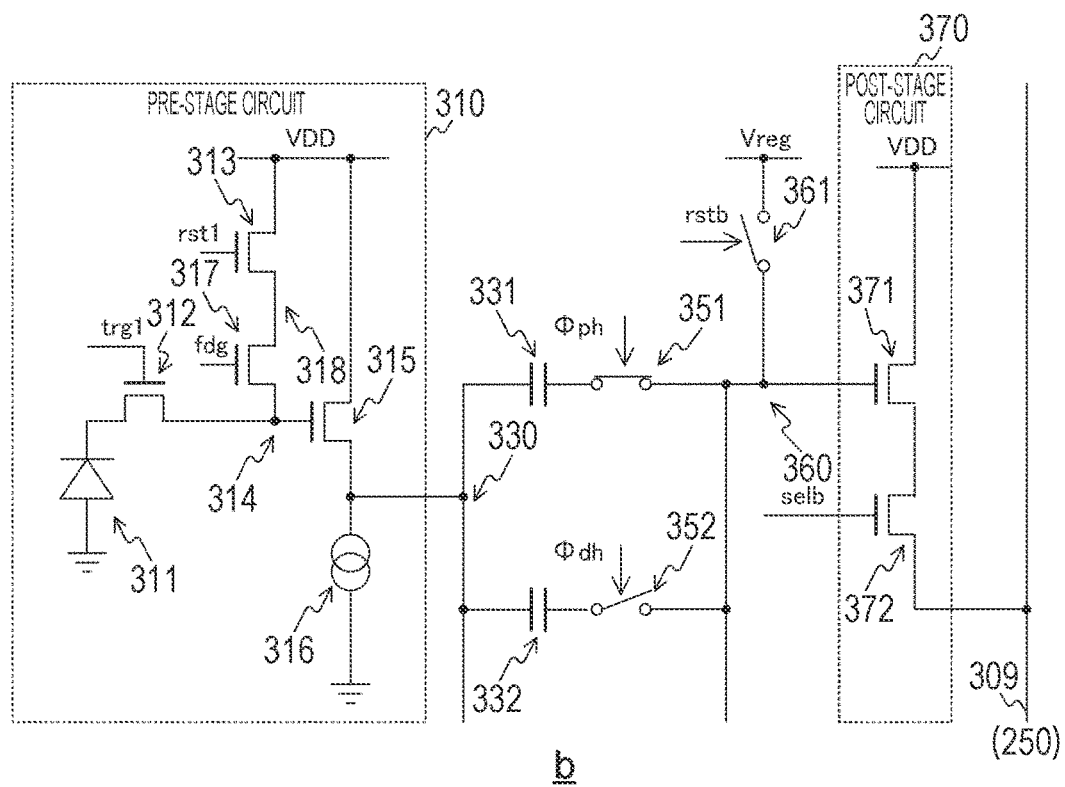

FIG. 12 is a diagram depicting an example of states of a pixel block at the time of the initialization of the post-stage node and at the time of reading the reset level in the first embodiment of the present technology. In the drawing, a indicates a state of a pixel block 300 at the time of the initialization of the post-stage node 360, and b in the drawing indicates a state of the pixel block 300 at the time of reading the reset level. Furthermore, in the drawing, the selection transistor 351, the selection transistor 352, and the post-stage reset transistor 361 are represented by graphical symbols of switches for convenience of description. Furthermore, the selection transistors 353 and 354 are omitted.

As illustrated in a of the drawing, immediately before the reset level is read, the vertical scanning circuit 211 opens the selection transistors 351 to 354 and closes the post-stage reset transistor 361. Therefore, the capacitive elements 331 and 332 are disconnected from the post-stage node 360, and the level of the post-stage node 360 is initialized.

The capacitance value of a parasitic capacitance Cp of the post-stage node 360 disconnected from the capacitive elements 331 and 332 in this manner is assumed to be very small as compared with the capacitive elements 331 and 332. For example, assuming that the parasitic capacitance Cp is several femtofarads (fF), the capacitive elements 331 and 332 are on the order of several tens of femtofarads.

Then, as illustrated in b of the drawing, the vertical scanning circuit 211 closes the selection transistor 351, and opens the selection transistor 352 and the post-stage reset transistor 361. Therefore, the HC reset level is read through the post-stage circuit 370.

Figure 13:
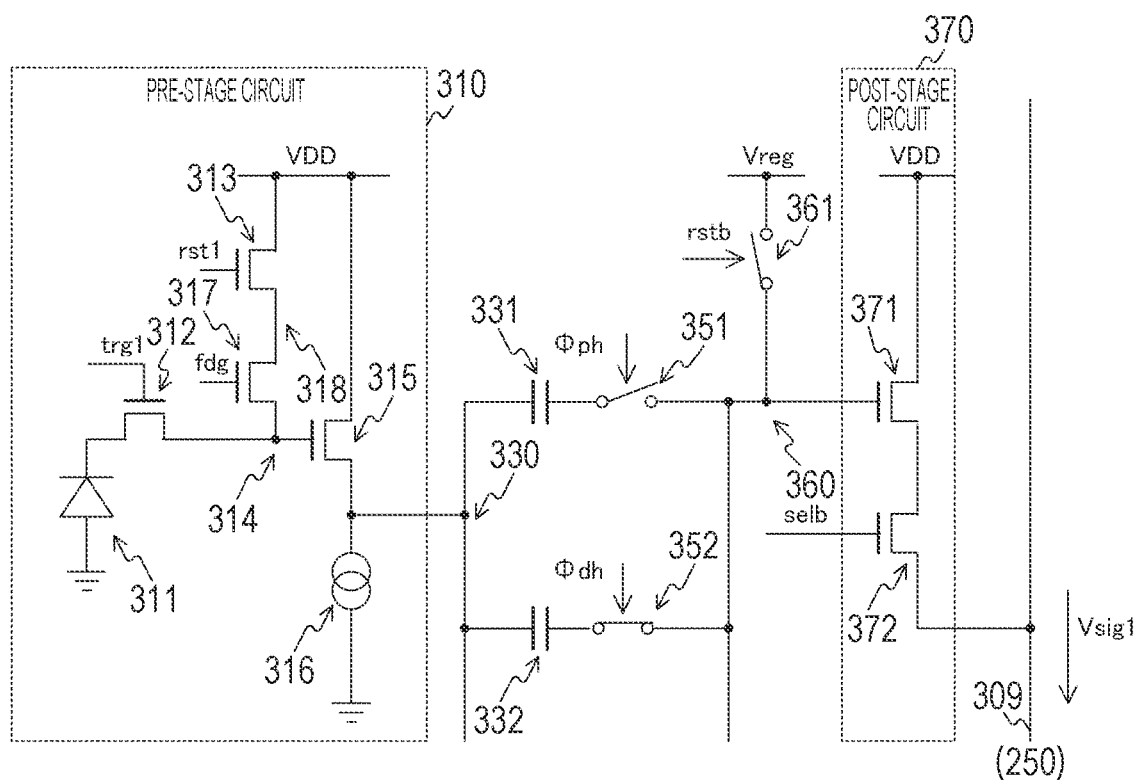
FIG. 13 is a diagram depicting an example of a state of the pixel at the time of reading a signal level in the first embodiment of the present technology.

FIG. 13 is a diagram depicting an example of a state of the pixel block 300 at the time of reading the signal level in the first embodiment of the present technology.

After the HC reset level is read, the vertical scanning circuit 211 closes the selection transistor 352, and opens the selection transistor 351 and the post-stage reset transistor 361. Therefore, the HC signal level is read through the post-stage circuit 370.

Here, kTC noise at the time of exposure of pixels is considered. At the time of the exposure, kTC noise occurs in each of sampling of the reset level and sampling of the signal level immediately before the end of the exposure. Assuming that the capacitance value of each of the capacitive elements 331 to 334 is C, a level Vn of kTC noise at the time of the exposure is expressed by the following expression.

$$Vn = (2*kT/C)^{1/2} \qquad \text{Expression 2}$$

Furthermore, as illustrated in FIGS. 12 and 13, since the post-stage reset transistor 361 is driven at the time of the reading, kTC noise occurs at that time.

However, the capacitive elements 331 and 332 are disconnected at the time of driving the post-stage reset transistor 361, and the parasitic capacitance Cp at that time is small. Therefore, the kTC noise at the time of the reading can be ignored as compared with the kTC noise at the time of the exposure. Therefore, the kTC noise at the time of the exposure and the reading is expressed by Expression 2.

With Expressions 1 and 2, in the pixel block 300 in which the capacitor is disconnected at the time of the reading, the kTC noise is smaller than that in the comparative example in which the capacitor cannot be disconnected at the time of the reading. Therefore, the image quality of the image data can be improved.

Figure 14:
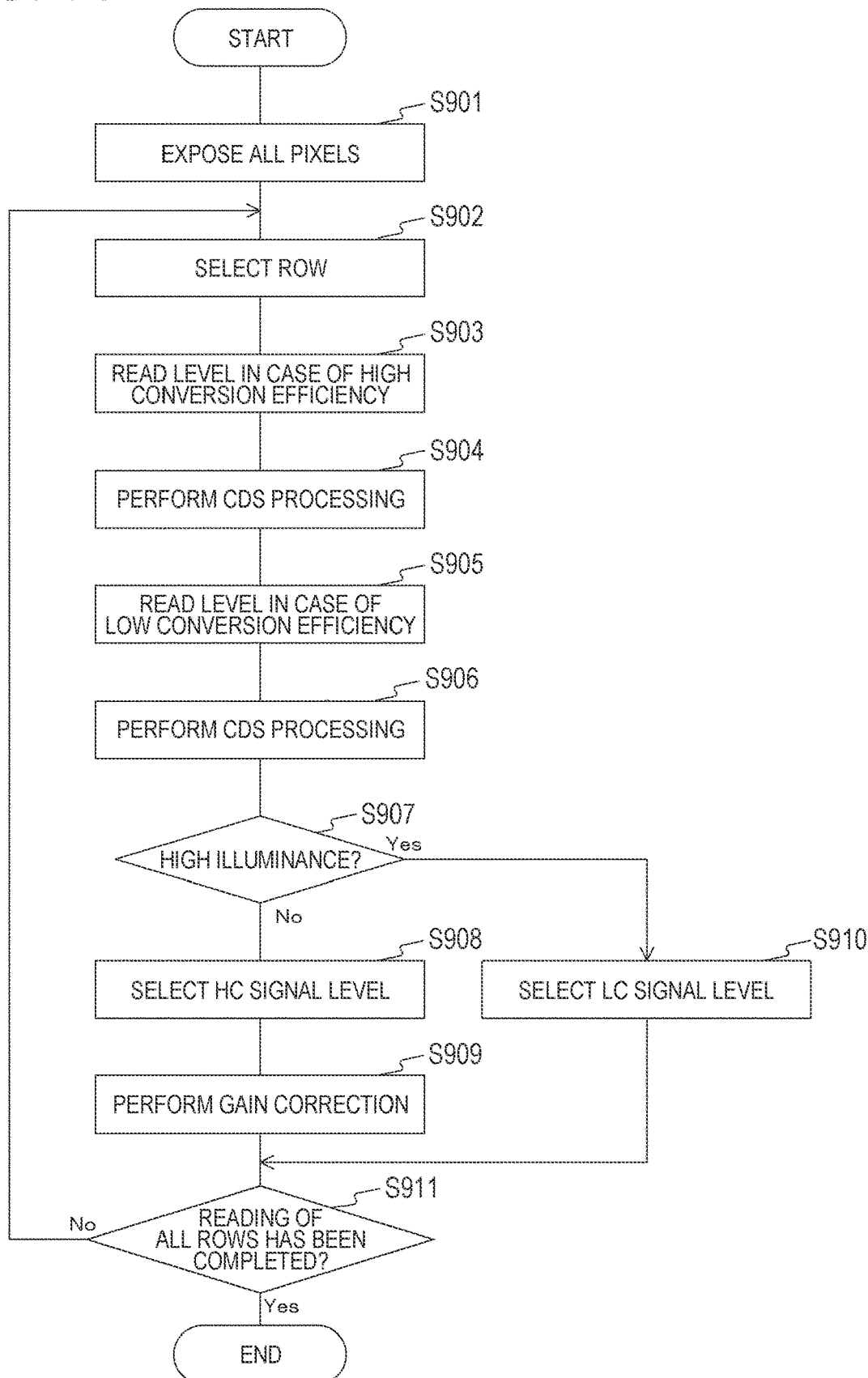
FIG. 14 is a flowchart depicting an example of an operation of the solid-state imaging element in the first embodiment of the present technology.

FIG. 14 is a flowchart depicting an example of the operation of the solid-state imaging element 200 in the first embodiment of the present technology. The operation is started, for example, in a case where a predetermined application for capturing image data is executed.

The vertical scanning circuit 211 exposes all the pixels (step S901). Then, the vertical scanning circuit 211 selects a row to be read (step S902). The column signal processing circuit 260 reads the level (HC reset level and HC signal level) of the row in a case of the high conversion efficiency (step S903) and performs the CDS processing (step S904). Next, the column signal processing circuit 260 reads the level (LC reset level and LC signal level) of the row in a case of the low conversion efficiency (step S905) and performs the CUS processing (step S906).

The column signal processing circuit 260 determines whether or not illuminance is the high illuminance for each column (step S907). In a case where a certain column has the low illuminance (step S907: No), the column signal processing circuit 260 selects the HC signal level for the column (step S908) and performs gain correction (step S909). In a case where a certain column has the high illuminance (step S907: Yes), the column signal processing circuit 260 selects the LC signal level for the column (step S910).

After step S909 or S910, the solid-state imaging element 200 determines whether or not the reading of all the rows has been completed (step S911). In a case where the reading of all the rows has not been completed (step S911: No), the solid-state imaging element 200 repeatedly executes step S902 and subsequent steps. On the other hand, in a case where the reading of all the rows has been completed (step S911: Yes), the solid-state imaging element 200 performs the CDS processing or the like, and ends the operation for imaging. In a case where a plurality of pieces of image data is continuously captured, steps S901 to S911 are repeatedly executed in synchronization with the vertical synchronization signal.

As described above, according to the first embodiment of the present technology, the solid-state imaging element 200 controls the conversion efficiency by the conversion efficiency control transistor 317 and holds the HC reset level, the HC signal level, the LC reset level, and the LC signal level in the capacitive elements 331 to 334. Therefore, in the global shutter method, the gain can be lowered under the high illuminance, and the gain can be increased under the low illuminance. This dual-gain drive allows an improvement in image quality by reducing the input referred noise while increasing the sensitivity.

First Modification Example

In the first embodiment described above, the circuits in the solid-state imaging element 200 are provided in a single semiconductor chip, but in this configuration, there is a possibility that the element does not fit in the semiconductor chip in a case where the pixel is miniaturized. The solid-state imaging element 200 of the first modification example of the first embodiment is different from that of the first embodiment in that the circuits in the solid-state imaging element 200 are dispersedly arranged in two semiconductor chips.

Figure 15:
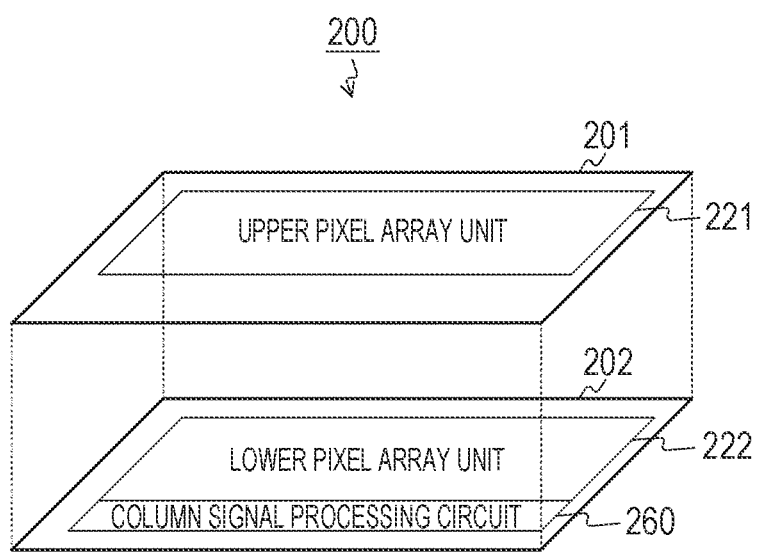
FIG. 15 is a diagram depicting an example of a laminated structure of a solid-state imaging element in a first modification example of the first embodiment of the present technology.

FIG. 15 is a diagram depicting an example of a laminated structure of the solid-state imaging element 200 in the first modification example of the first embodiment of the present technology. The solid-state imaging element 200 of the first modification example of the first embodiment includes a circuit chip 202 and a pixel chip 201 stacked on the circuit chip 202. These chips are electrically connected by, for example, Cu—Cu bonding. Note that, in addition to the Cu—Cu bonding, connection can be made by a via or a bump.

An upper pixel array unit 221 is arranged in the pixel chip 201. A lower pixel array unit 222 and the column signal processing circuit 260 are arranged in the circuit chip 202. For each pixel in the pixel array unit 220, a part of the pixel is arranged in the upper pixel array unit 221, and the rest is arranged in the lower pixel array unit 222.

Furthermore, in the circuit chip 202, the vertical scanning circuit 211, the timing control circuit 212, the DAC 213, and the load MOS circuit block 250 are also arranged. These circuits are omitted in the drawing.

Furthermore, the pixel chip 201 is manufactured, for example, by a pixel-dedicated process, and the circuit chip 202 is manufactured, for example, by a complementary MOS (CMOS) process. Note that the pixel chip 201 is an example of a first chip described in the claims, and the circuit chip 202 is an example of a second chip described in the claims.

Figure 16:
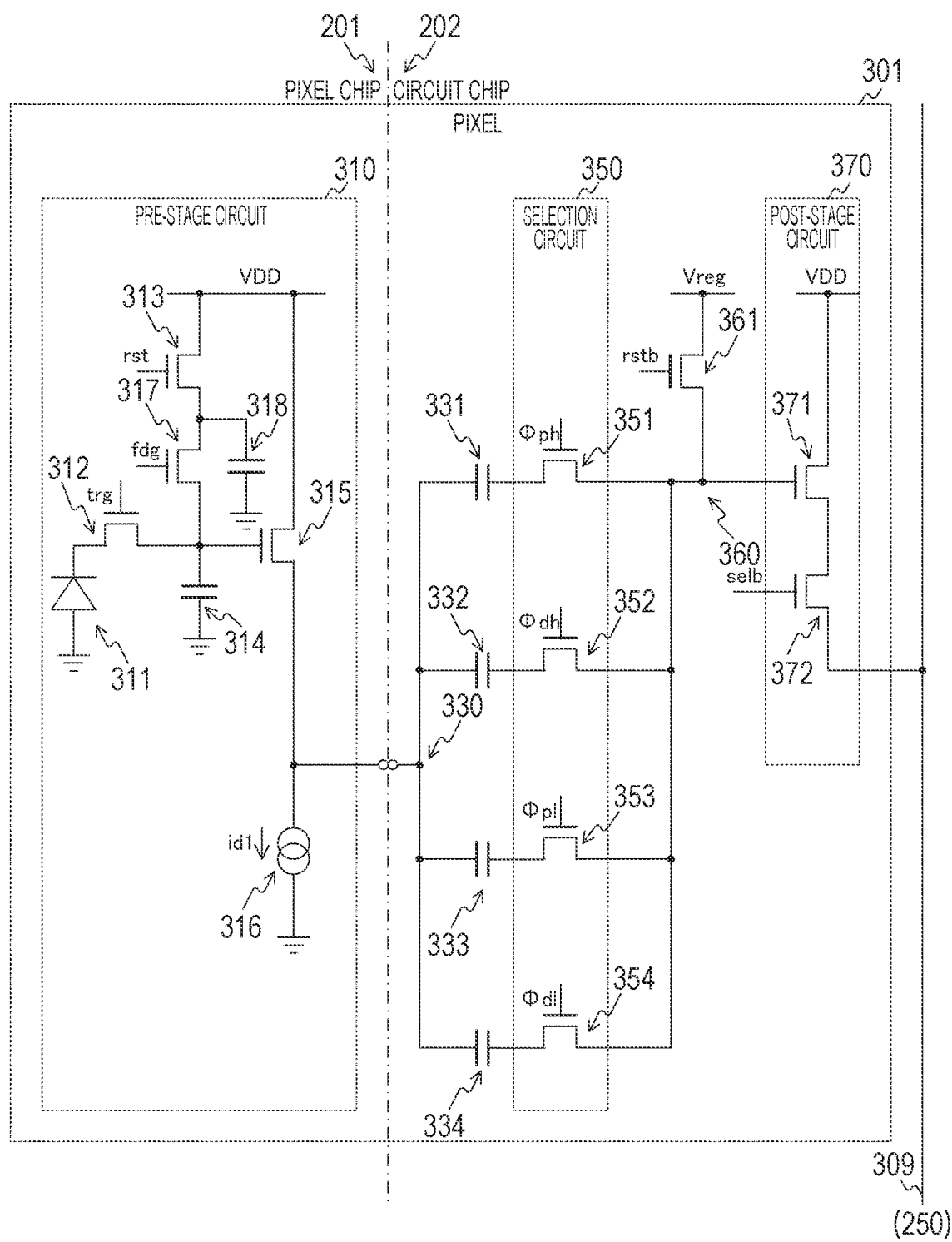
FIG. 16 is a circuit diagram depicting a configuration example of a pixel in the first modification example of the first embodiment of the present technology.

FIG. 16 is a circuit diagram depicting a configuration example of a pixel 301 in the first modification example of the first embodiment of the present technology. In the pixel 301, the pre-stage circuit 310 is arranged in the pixel chip 201, and other circuits and elements (such as the capacitive elements 331 to 334) are arranged in the circuit chip 202. Note that the current source transistors 316 can be further arranged in the circuit chip 202. As illustrated in the drawing, by dispersedly arranging the elements in the pixel 301 in the stacked pixel chip 201 and circuit chip 202, the pixel area can be reduced, and pixel miniaturization is facilitated.

As described above, according to the first modification example of the first embodiment of the present technology, since the circuits and elements in the pixel block 300 are dispersedly arranged in the two semiconductor chips, pixel miniaturization is facilitated.

Second Modification Example

In the first modification example of the first embodiment described above, a part of the pixel 301 and the peripheral circuit (such as the column signal processing circuit 260) are provided in the circuit chip 202 on the lower side. However, with this configuration, the arrangement area of the circuits and elements on the circuit chip 202 side is larger than that of the pixel chip 201 by the peripheral circuit, and there is a possibility that an unnecessary space without circuits and elements is generated in the pixel chip 201. The solid-state imaging element 200 of the second modification example of the first embodiment is different from that of the first modification example of the first embodiment in that the circuits in the solid-state imaging element 200 are dispersedly arranged in three semiconductor chips.

Figure 17:
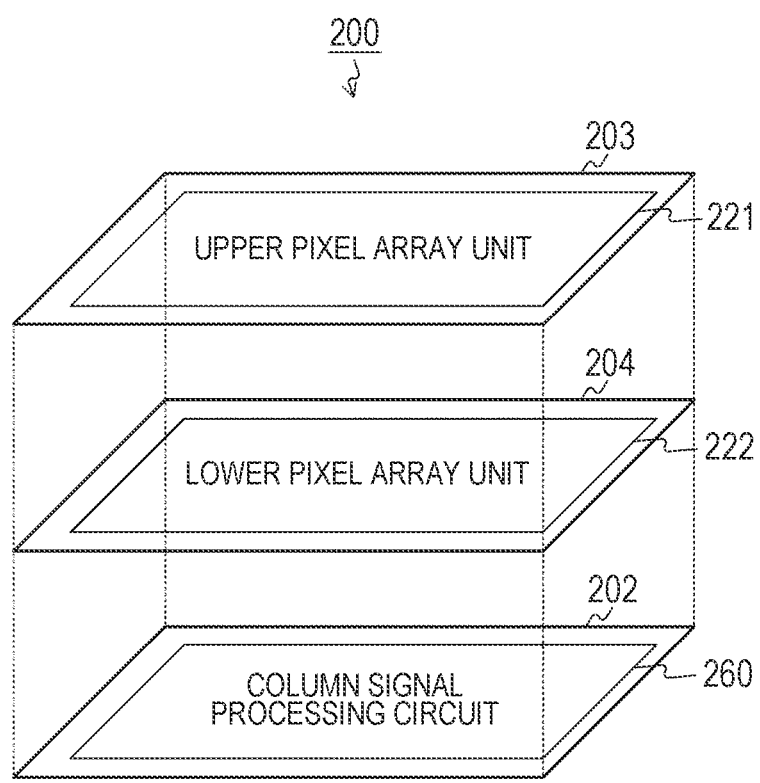
FIG. 17 is a diagram depicting an example of a laminated structure of a solid-state imaging element in a second modification example of the first embodiment of the present technology.

FIG. 17 is a diagram depicting an example of a laminated structure of the solid-state imaging element 200 in the second modification example of the first embodiment of the present technology. The solid-state imaging element 200 of the second modification example of the first embodiment includes an upper pixel chip 203, a lower pixel chip 204, and the circuit chip 202. These chips are stacked, and are electrically connected by, for example, Cu—Cu bonding. Note that, in addition to the Cu—Cu bonding, connection can be made by a via or a bump.

The upper pixel array unit 221 is arranged in the upper pixel chip 203. The lower pixel array unit 222 is arranged in the lower pixel chip 204. For each pixel in the pixel array unit 220, a part of the pixel is arranged in the upper pixel array unit 221, and the rest is arranged in the lower pixel array unit 222.

Furthermore, in the circuit chip 202, the column signal processing circuit 260, the vertical scanning circuit 211, the timing control circuit 212, the DAC 213, and the load MOS circuit block 250 are arranged.

Circuits other than the column signal processing circuit 260 are omitted in the drawing.

Note that the upper pixel chip 203 is an example of a first chip described in the claims, and the lower pixel chip 204 is an example of a second chip described in the claims. The circuit chip 202 is an example of a third chip described in the claims.

By adopting the three-layer configuration as illustrated in the drawing, it is possible to reduce unnecessary space and further miniaturize the pixel as compared with the two-layer configuration. Furthermore, the lower pixel chip 204 that is a second layer can be manufactured by a dedicated process for the capacitor and switch.

As described above, in the second modification example of the first embodiment of the present technology, since the circuits in the solid-state imaging element 200 are dispersedly arranged in the three semiconductor chips, the pixel can be further miniaturized as compared with a case where the circuits are dispersedly arranged in the two semiconductor chips.

2. Second Embodiment

In the first embodiment described above, illuminance is determined after the HC reset level, the HC signal level, the LC reset level, and the LC signal level are sequentially AD-converted for each row, but in this configuration, the reading speed may be insufficient. The solid-state imaging element 200 of the second embodiment is different from that of the first embodiment in that the frequency of AD conversion is reduced, and the reading speed is improved by determining illuminance before AD conversion.

Figure 18:
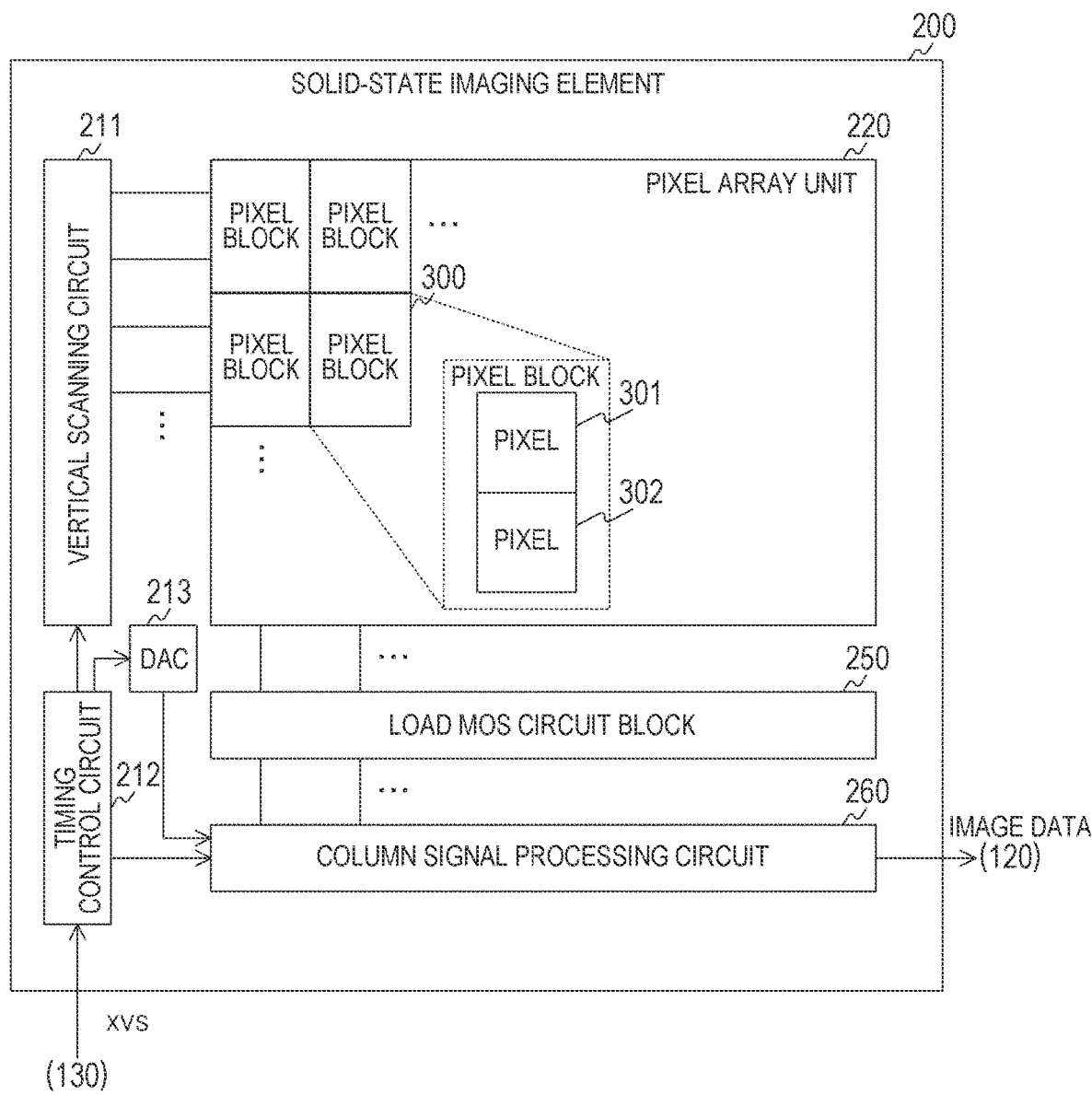
FIG. 18 is a block diagram depicting a configuration example of a solid-state imaging element in a second embodiment of the present technology.

FIG. 18 is a block diagram depicting a configuration example of the solid-state imaging element 200 in the second embodiment of the present technology. In the pixel array unit 220 of the second embodiment, a plurality of pixel blocks 300 is arranged. In each of the pixel blocks 300, the pixel 301 and a pixel 302 are arranged. The pixels 301 and 302 are arranged in a vertical direction, for example. Note that the pixels in the pixel block 300 can be arranged in a horizontal direction or in an oblique direction.

Figure 19:
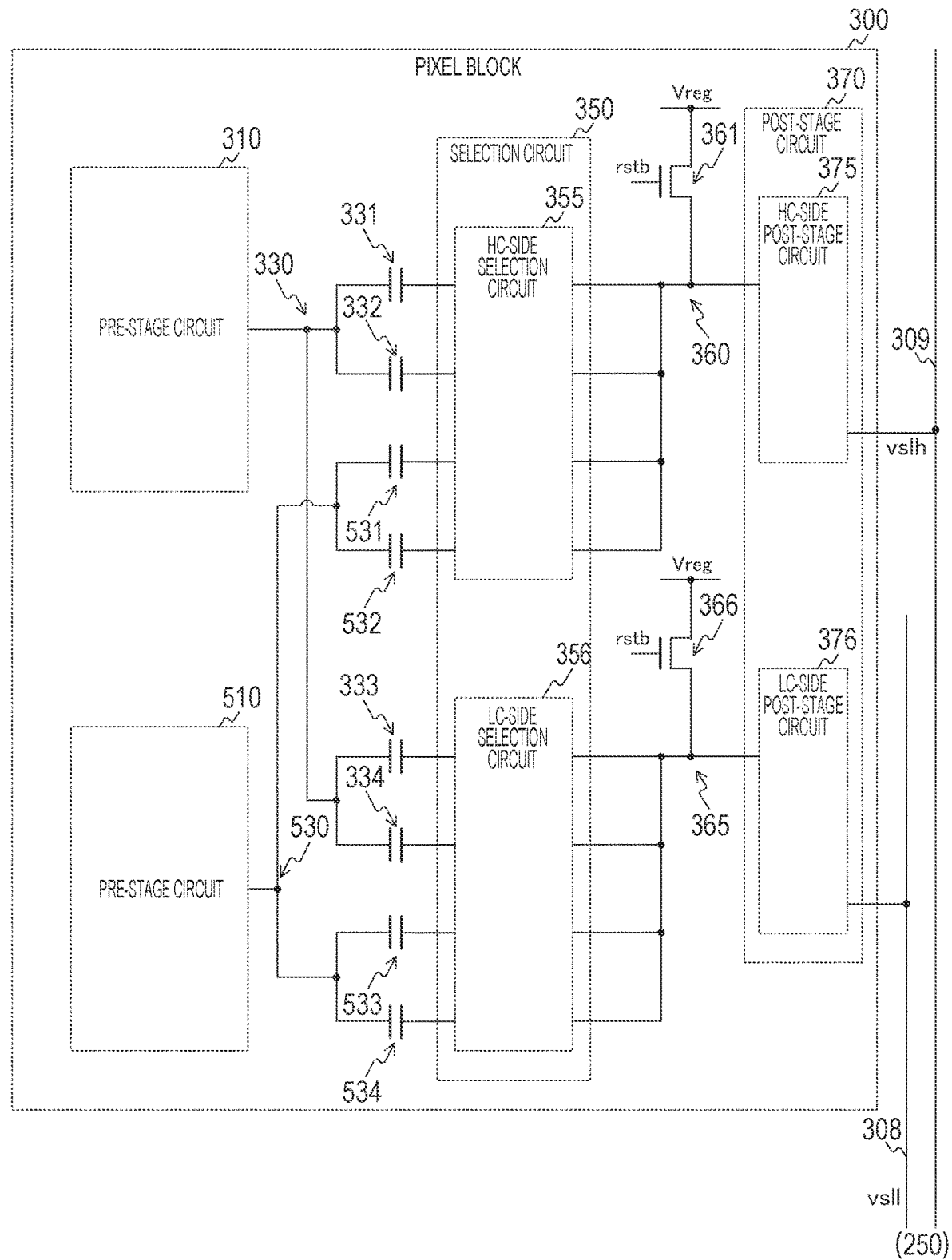
FIG. 19 is a block diagram depicting a configuration example of a pixel block in the second embodiment of the present technology.

FIG. 19 is a block diagram depicting a configuration example of the pixel block 300 in the second embodiment of the present technology. In the pixel block 300, pre-stage circuits 310 and 510, the capacitive elements 331 to 334, capacitive elements 531 to 534, the selection circuit 350, post-stage reset transistors 361 and 366, and the post-stage circuit 370 are arranged.

In the selection circuit 350, an HC-side selection circuit 355 and an LC-side selection circuit 356 are arranged. Furthermore, in the post-stage circuit 370, an HC-side post-stage circuit 375 and an LC-side post-stage circuit 376 are arranged.

The capacitive elements 331 and 332 have their respective one ends commonly connected to the pre-stage circuit 310 via the pre-stage node 330, and have their respective other ends connected to the HC-side selection circuit 355. The capacitive elements 333 and 334 have their respective one ends commonly connected to the pre-stage circuit 310 via the pre-stage node 330, and have their respective other ends connected to the LC-side selection circuit 356.

The capacitive elements 531 and 532 have their respective one ends commonly connected to the pre-stage circuit 510 via a pre-stage node 530, and have their respective other ends connected to the HC-side selection circuit 355. The capacitive elements 533 and 534 have their respective one ends commonly connected to the pre-stage circuit 510 via the pre-stage node 530, and have their respective other ends connected to the LC-side selection circuit 356.

Furthermore, the HC-side selection circuit 355 is connected to the HC-side post-stage circuit 375 via the post-stage node 360, and the LC-side selection circuit 356 is connected to the LC-side post-stage circuit 376 via a post-stage node 365.

The post-stage reset transistor 361 initializes the post-stage node 360 in accordance with the post-stage reset signal rstb, and the post-stage reset transistor 366 initializes the post-stage node 365 in accordance with the post-stage reset signal rstb.

Furthermore, in the pixel array unit 220, vertical signal lines 308 and 309 are wired for each column of the pixel block 300. The HC-side post-stage circuit 375 outputs a signal through the vertical signal line 309, and the LC-side post-stage circuit 376 outputs a signal through the vertical signal line 308. A potential of the vertical signal line 308 is denoted as vsll, and a potential of the vertical signal line 309 is denoted as vslh.

A circuit including the pre-stage circuit 310, the capacitive elements 331 to 334, the selection circuit 350, the post-stage reset transistors 361 and 366, and the post-stage circuit 370 in the drawing functions as the pixel 301. Furthermore, a circuit including the pre-stage circuit 510, the capacitive elements 531 to 534, the selection circuit 350, the post-stage reset transistors 361 and 366, and the post-stage circuit 370 functions as the pixel 302. The pixels 301 and 302 share the selection circuit 350 and the subsequent parts, so that it is possible to reduce the circuit scale as compared with a case of no sharing.

Figure 20:
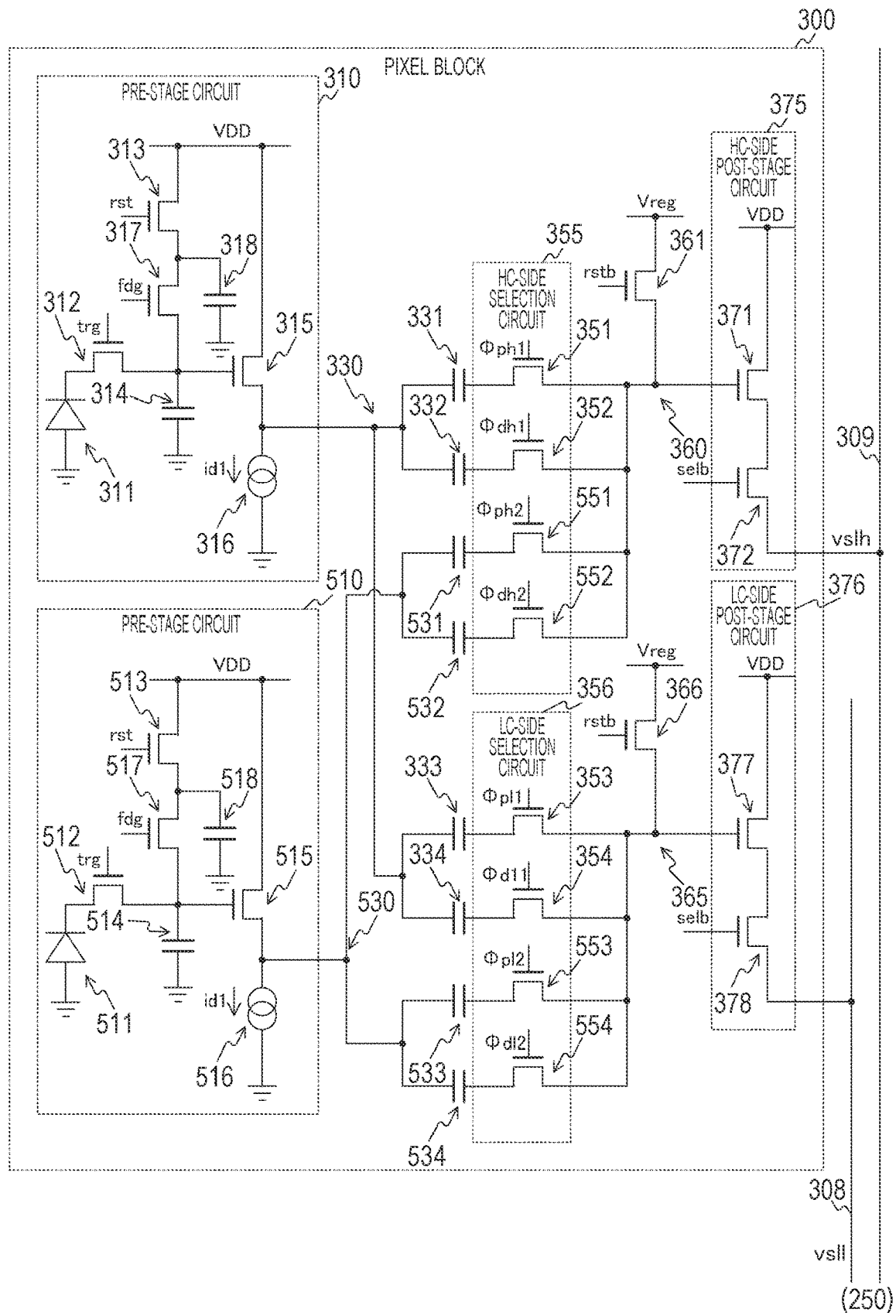
FIG. 20 is a circuit diagram depicting a configuration example of the pixel block in the second embodiment of the present technology.

FIG. 20 is a circuit diagram depicting a configuration example of the pixel block 300 in the second embodiment of the present technology. A configuration of the pre-stage circuit 310 of the second embodiment is similar to that of the first embodiment.

The pre-stage circuit 510 includes a photoelectric conversion element 511, a transfer transistor 512, an FD reset transistor 513, an FD 514, a pre-stage amplification transistor 515, a current source transistor 516, a conversion efficiency control transistor 517, and an FD 518. A connection configuration of these elements is similar to that of the elements in the pre-stage circuit 310.

In the HC-side selection circuit 355, selection transistors 351, 352, 551 and 552 are arranged. In the LC-side selection circuit 356, selection transistors 353, 354, 553 and 554 are arranged. In the HC-side post-stage circuit 375, the post-stage amplification transistor 371 and the post-stage selection transistor 372 are arranged, and in the LC-side post-stage circuit 376, a post-stage amplification transistor 377 and a post-stage selection transistor 378 are arranged.

A connection configuration of the selection transistors 351 to 354, and the post-stage amplification transistor 371 and the post-stage selection transistor 372 of the second embodiment is similar to that of the first embodiment. However, selection signals Φph1, Φdh1, Φpl1, and Φdl1 are supplied to the selection transistors 351, 352, 353, and 354.

The selection transistor 551 opens and closes a path between the capacitive element 531 and the post-stage node 360 in accordance with a selection signal Φph2 from the vertical scanning circuit 211. The selection transistor 552 opens and closes a path between the capacitive element 532 and the post-stage node 360 in accordance with a selection signal Φdh2 from the vertical scanning circuit 211.

The selection transistor 553 opens and closes a path between the capacitive element 533 and the post-stage node 365 in accordance with a selection signal Φpl2 from the vertical scanning circuit 211. The selection transistor 554 opens and closes a path between the capacitive element 534 and the post-stage node 365 in accordance with a selection signal Φdh2 from the vertical scanning circuit 211.

A connection configuration of the post-stage amplification transistor 377 and the post-stage selection transistor 378 is similar to that of the post-stage amplification transistor 371 and the post-stage selection transistor 372.

With the circuit configuration illustrated in the drawing, the HC reset level and the HC signal level are output from the vertical signal line 309. Furthermore, the LC reset level and the LC signal level are output from the vertical signal line 308. The configuration where the HC side and the LC side are individually provided with a circuit and a vertical signal line allows the HC-side signal (reset level and signal level) and the LC-side signal to be read in parallel.

Note that the pre-stage circuits 310 and 510 are examples of first and second pre-stage circuits described in the claims. The FDs 314 and 318 are an example of a pair of first floating diffusion layers described in the claims. The FDs 514 and 518 are an example of a pair of second floating diffusion layers described in the claims. The conversion efficiency control transistors 317 and 517 are examples of a first conversion efficiency control transistor and a second conversion efficiency control transistor described in the claims. The capacitive elements 531, 532, 533, and 534 are examples of fifth, sixth, seventh, and eighth capacitive elements described in the claims.

Figure 21:
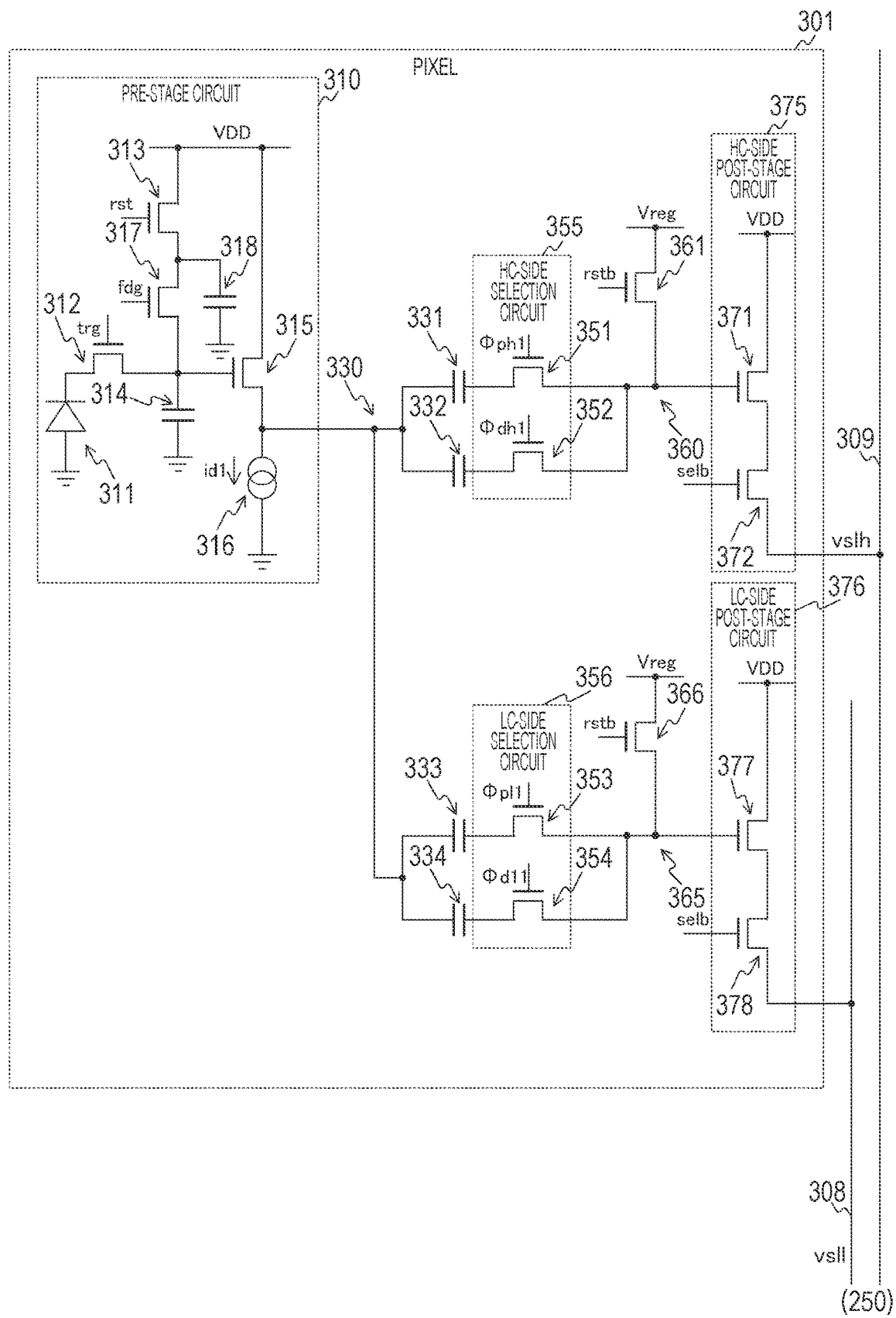
FIG. 21 is a circuit diagram depicting another configuration example of the pixel in the second embodiment of the present technology.

Furthermore, the pixels 301 and 302 may share the selection circuit 350 and the subsequent parts, but may not share the selection circuit 350 and the subsequent parts. In this case, as illustrated in FIG. 21, a circuit obtained by removing the pre-stage circuit 510, the capacitive elements 531 to 534, and the selection transistors 551 to 554 from the pixel block 300 is arranged in the pixel 301.

Figure 22:
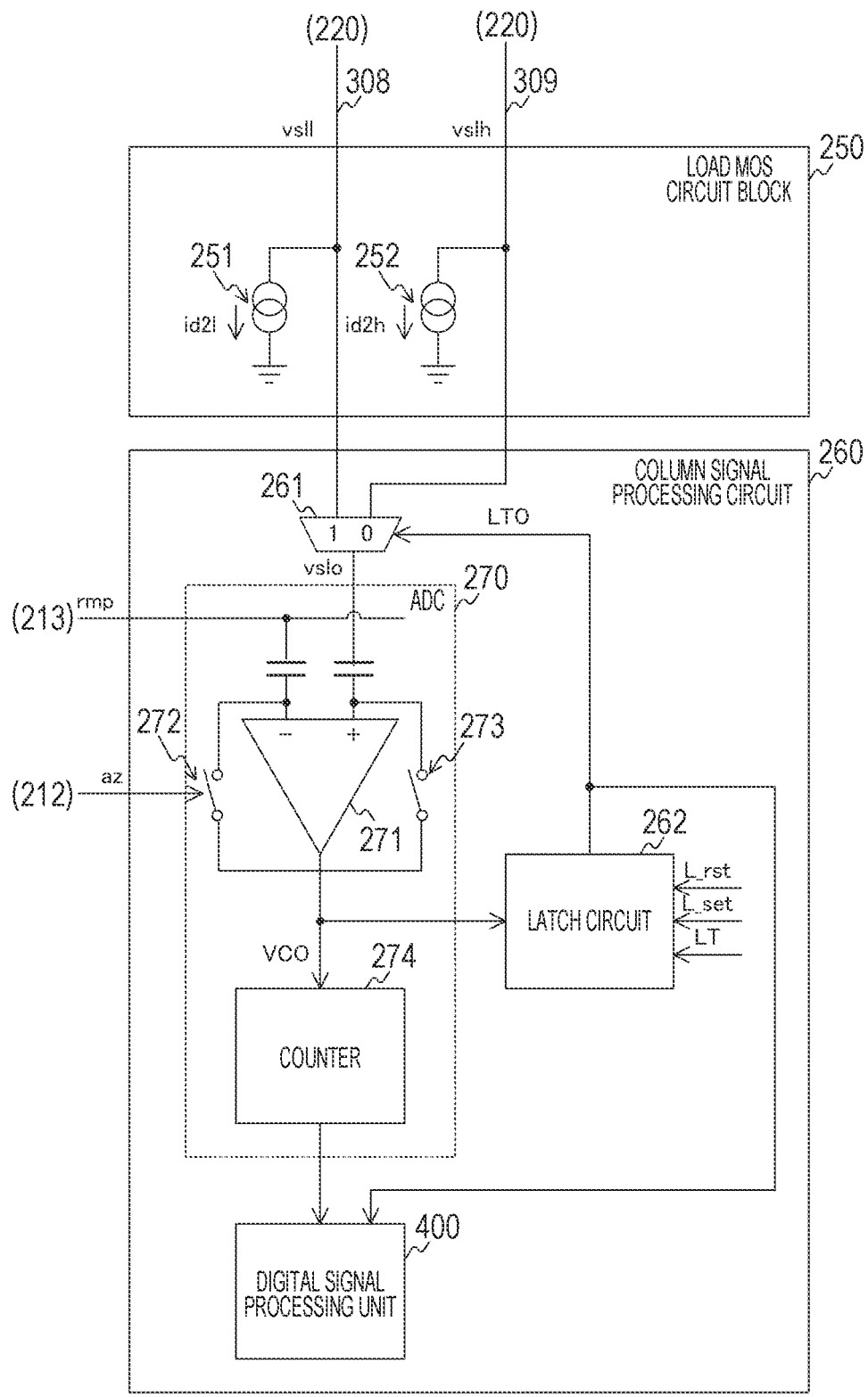
FIG. 22 is a block diagram depicting a configuration example of a column signal processing circuit in the second embodiment of the present technology.

FIG. 22 is a block diagram depicting a configuration example of the column signal processing circuit 260 in the second embodiment of the present technology. In the column signal processing circuit 260 of the second embodiment, a selector 261 and a latch circuit 262 are arranged in addition to the ADC 270 and the digital signal processing unit 400 for each column of the pixel block 300.

The selector 261 selects one of the potential vsll of the LC-side vertical signal line 308 or the potential vslh of the HC-side vertical signal line 309 in accordance with a latch output signal LTO from the latch circuit 262. The selector 261 outputs the selected potential as an output potential vslo to the comparator 271 in the ADC 270. Note that the selector 261 is an example of a pre-stage selector described in the claims.

Furthermore, the latch circuit 262 generates the latch output signal LTO on the basis of the comparison result VCO. In addition to the comparison result VCO, a reset signal L_rst, a set signal L_set, and a latch signal LT are input from the timing control circuit 212 to the latch circuit 262. Furthermore, the latch circuit 262 outputs the latch output signal LTO to the selector 261 and the digital signal processing unit 400.

FIG. 23 is a diagram depicting an example of an operation of the latch circuit 262 in the second embodiment of the present technology. In a case where the reset signal L_rst is at the high level, the latch output signal LTO is reset to the low level regardless of the set signal L_set, the latch signal LT, and the comparison result VCO (input).

In a case where only the set signal L_set out of the reset signal L_rst and the set signal L_set is at the high level, the latch output signal LTO is set to the high level regardless of the latch signal LT and the comparison result VCO.

In a case where only the latch signal LT out of the reset signal L_rst, the set signal L_set, and the latch signal LT is at the high level, the comparison result VCO is through-output as the latch output signal LTO as it is.

In a case where the reset signal L_rst, the set signal L_set, and the latch signal LT are at the low level, the latch circuit 262 enters a latch state, and the last value is output as the latch output signal LTO.

Figure 24:
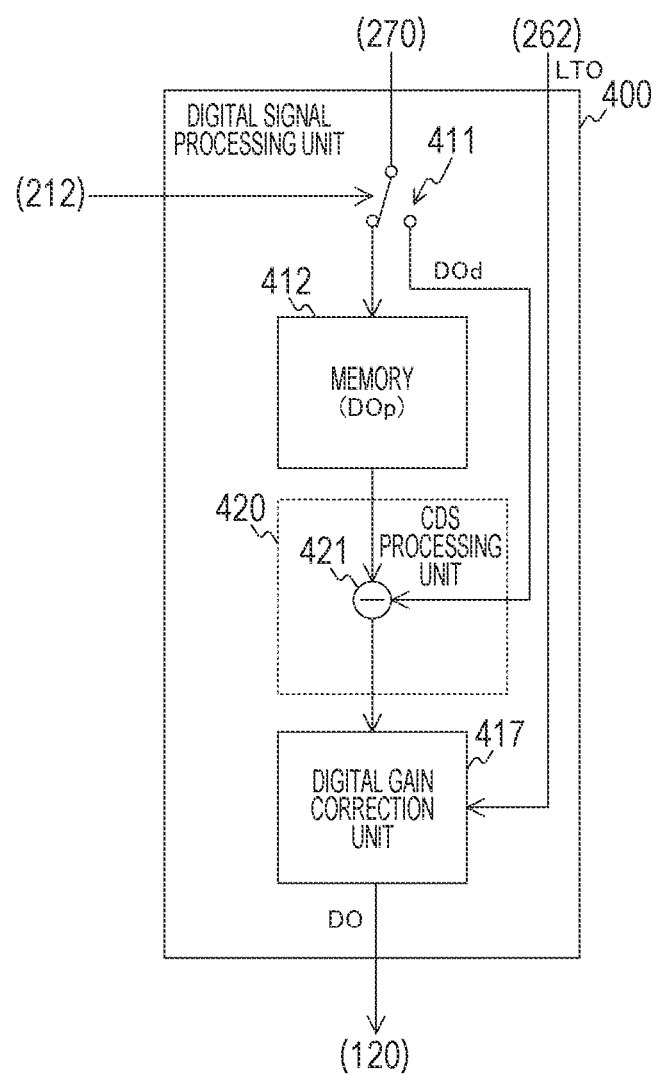
FIG. 24 is a block diagram depicting a configuration example of a digital signal processing unit in the second embodiment of the present technology.

FIG. 24 is a block diagram depicting a configuration example of the digital signal processing unit 400 in the second embodiment of the present technology. The digital signal processing unit 400 of the second embodiment is different from that of the first embodiment in that the selector 413, the illuminance determination unit 414, the memory 415, and the selector 416 are not arranged.

In the second embodiment, the CDS processing unit 420 supplies the digital signal of the difference to the digital gain correction unit 417. Furthermore, the digital gain correction unit 417 corrects the digital signal under the high illuminance on the basis of the latch output signal LTO.

Figure 25:
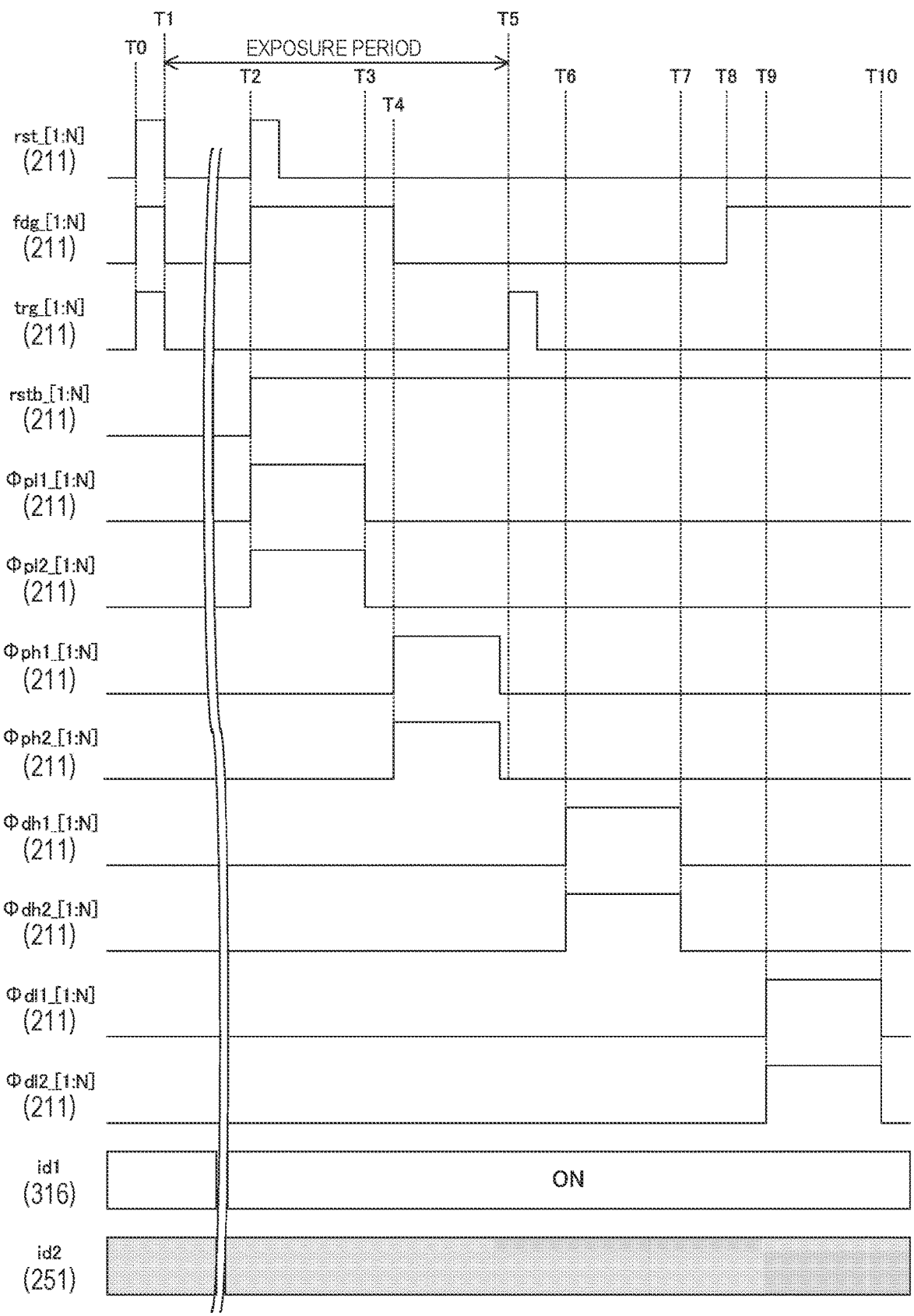
FIG. 25 is a timing chart depicting an example of a global shutter operation in the second embodiment of the present technology.

FIG. 25 is a timing chart depicting an example of a global shutter operation in the second embodiment of the present technology. How to control the FD reset signal rst, the control signal fdg, and the transfer signal trg of the second embodiment is similar to that of the first embodiment.

The vertical scanning circuit 211 sets the selection signals Φpl1 and Φpl2 to the high level during a period from timing T2 to timing T3. Then, the vertical scanning circuit 211 sets the selection signals Φph1 and Φph2 to the high level during a period from timing T4 to immediately before T5.

The vertical scanning circuit 211 sets the selection signals 4dh1 and 4dh2 to the high level during a period from timing T6 to timing T7. Then, the vertical scanning circuit 211 sets the selection signals Φdl1 and Φdl2 to the high level during a period from timing T9 to timing T10.

Figure 26:
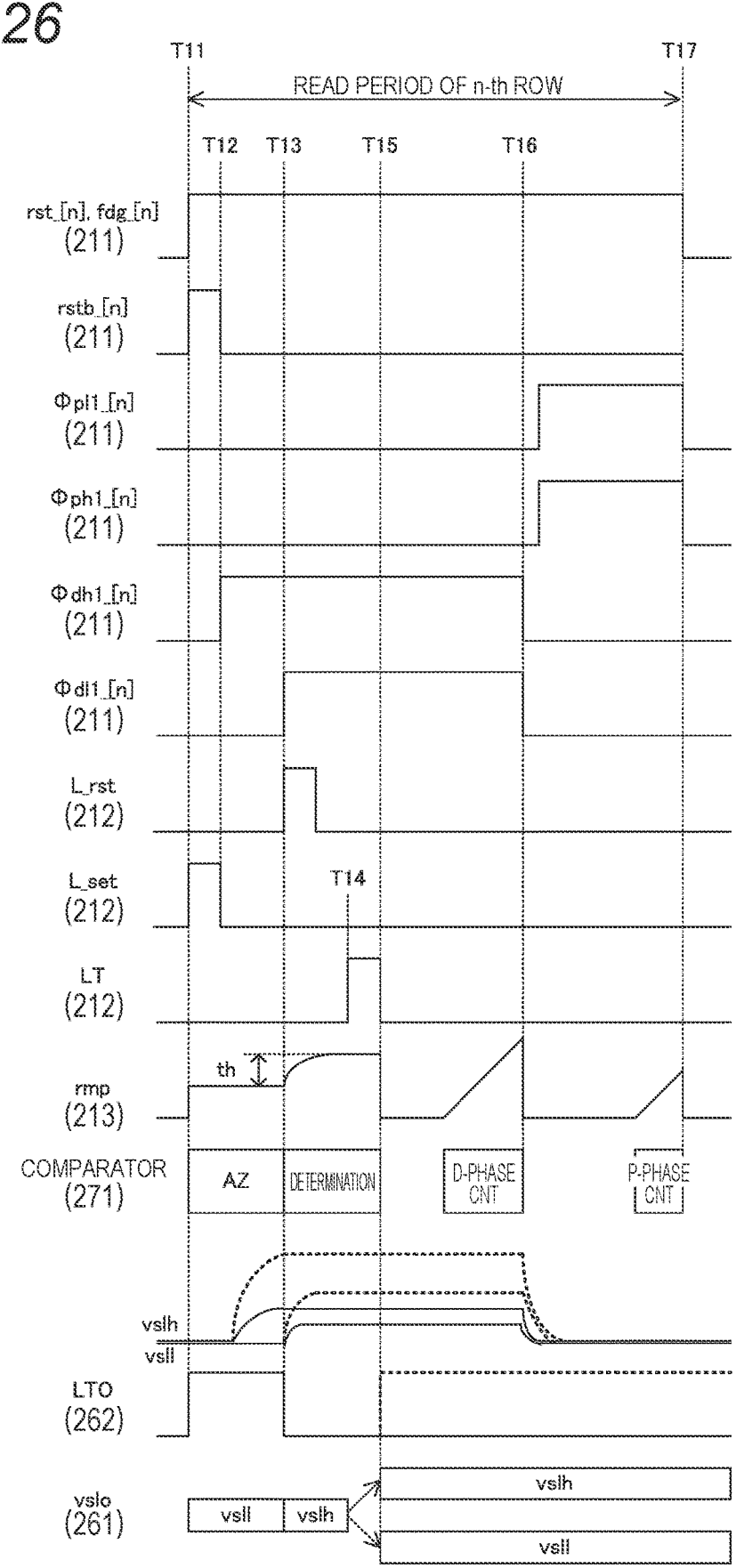
FIG. 26 is a timing chart depicting an example of a read operation of a first pixel in the second embodiment of the present technology.

FIG. 26 is a timing chart depicting an example of a read operation of the first pixel 301 in the second embodiment of the present technology. It is assumed that the pixel 301 belongs to the n-th row and the pixel 302 belongs to the (n+1)-th row.

During a period from timing T11 at the start of the reading of the n-th row to timing T12, the vertical scanning circuit 211 supplies the high-level post-stage reset signal rstb to the n-th row, and the timing control circuit 212 supplies the high-level set signal L_set. Therefore, the post-stage node 360 is initialized.

The vertical scanning circuit 211 sets the selection signal Φdh1 to the high level at timing T12, and sets the selection signal Φdl1 to the high level at timing T13.

Furthermore, the comparator 271 performs an auto-zero operation during a period from timing T11 to timing T13. In this auto-zero period, their respective potentials vsll and vslh of the vertical signal lines 308 and 309 increase in a manner that depends on illuminance. In the drawing, a solid line indicates changes in the potentials vsll and vslh under the low illuminance, and a dotted line indicates changes in the potentials vsll and vslh under the high illuminance.

Furthermore, the latch circuit 262 supplies the high-level latch output signal LTO during the auto-zero period. Furthermore, the selector 261 selects the LC-side potential vsll in the auto-zero period, selects the HC-side potential vslh in the determination period after the auto-zero period elapses, and outputs the potentials as the output potential vslo.

The timing control circuit 212 supplies the high-level reset signal L_rst over the pulse period from timing T13, and supplies the high-level latch signal LT over a period from timing T14 to timing T15. Therefore, the latch circuit 262 shifts to a through state at timing T14 after being reset, and latches the comparison result VCO at timing T15.

Furthermore, the ramp signal rmp increases by the threshold th during a period from timing T14 to timing T15. The comparator 271 compares the ramp signal rmp with the output potential vslo. The comparison result VCO latched at timing T15 indicates whether or not illuminance is higher than the predetermined value corresponding to the threshold th.

In a case where illuminance is the low illuminance that is less than or equal to the predetermined value, the comparator 271 outputs the low-level comparison result VCO, the latch circuit 262 latches the value, and the selector 261 selects the HC-side potential vslh in accordance with the output of the latch. A solid line in the drawing indicates changes in the latch output signal LTO under the low illuminance.

On the other hand, in a case where illuminance is the high illuminance, the comparator 271 outputs the high-level comparison result VCO, the latch circuit 262 latches the value, and the selector 261 selects the LC-side potential vsll in accordance with the output of the latch. A dotted line in the drawing indicates changes in the latch signal LTO under the high illuminance.

As described above, in the second embodiment, the comparator 271 determines whether or not illuminance is the high illuminance on the basis of the analog signal (vslo) before AD conversion.

The vertical scanning circuit 211 sets the selection signal Φdl1 to the low level and sets the selection signal Φdh1 to the low level for the n-th row at timing T16 after the illuminance determination. The reference voltage of the ramp signal rmp gradually increases over a period from predetermined timing after the illuminance determination to timing T16. Therefore, the selected one (D-phase) of the LC signal level and the HC signal level is AD-converted.

The vertical scanning circuit 211 supplies the high-level selection signals Φpl1 and Φdph1 to the n-th row over a period from immediately after timing T16 to timing T17. The reference voltage of the ramp signal rmp gradually increases over a period from predetermined timing after timing T16 to timing T17. Therefore, the selected one (P-phase) of the LC reset level and the HC reset level is AD-converted.

As illustrated in the drawing, since the comparator 271 determines illuminance before AD conversion, and the selector 261 switches the vertical signal line, AD conversion of each of the signal level and the reset level needs to be performed only once. Therefore, the reading speed can be improved as compared with the first embodiment in which AD conversion of each of the signal level and the reset level is performed twice.

Note that the timing control circuit 212 can also stop the supply of the current id2 corresponding to the unselected one of the vertical signal lines 308 and 309 in the read period after timing T15 at which illuminance has been determined. In this case, the timing control circuit 212 supplies both the LC-side and HC-side currents id2 during a period from the start of the reading to timing T15. Then, when it is determined that illuminance is the high illuminance at timing T15, the HC-side load MOS transistor 251 is controlled to stop the supply of the HC-side current id2. On the other hand, when it is determined that illuminance is the low illuminance, the timing control circuit 212 controls the LC-side load MOS transistor 251 to stop the supply of the LC-side current id2. By this control, power consumption can be further reduced.

Figure 27:
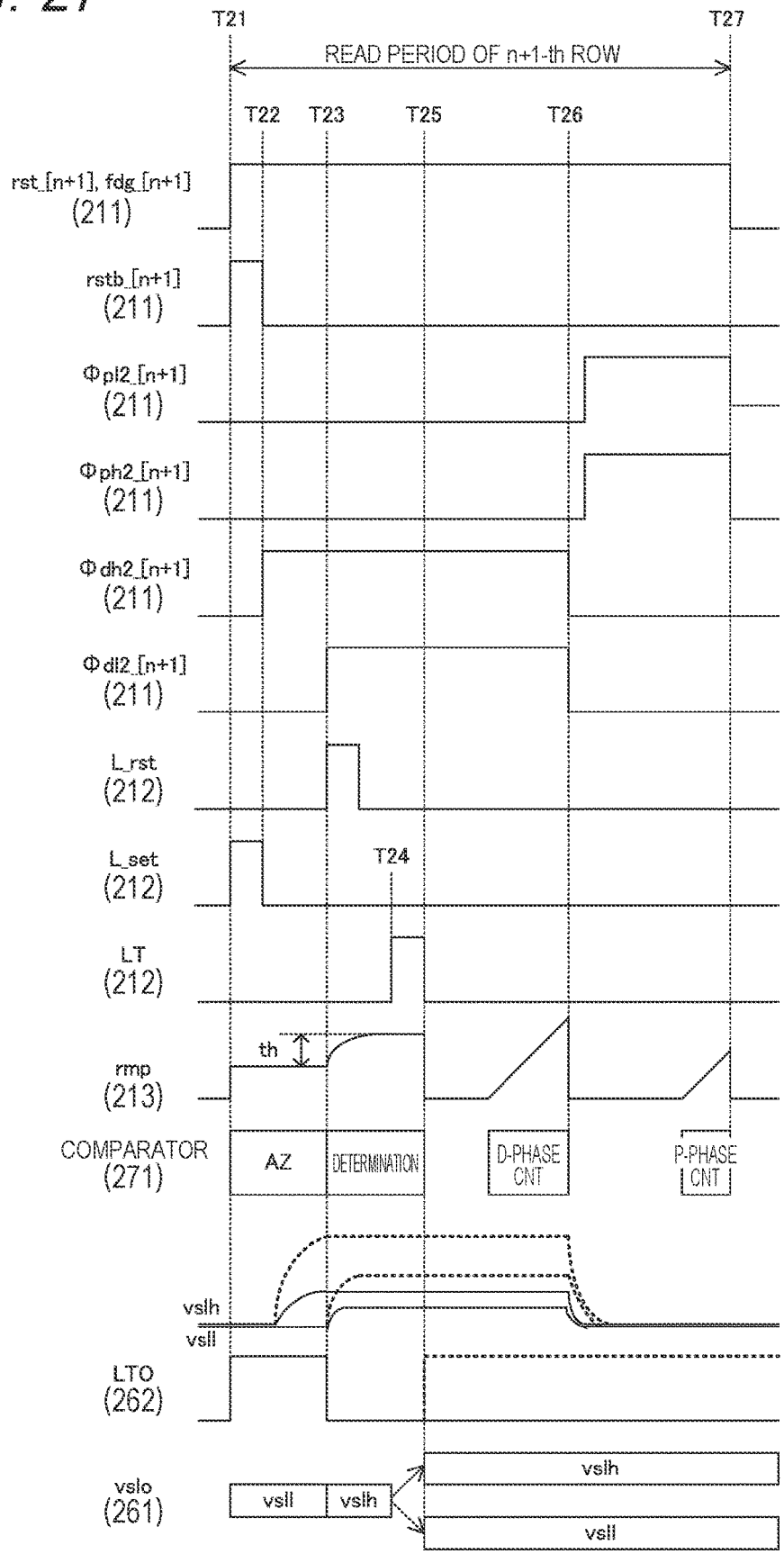
FIG. 27 is a timing chart depicting an example of a read operation of a second pixel in the second embodiment of the present technology.

FIG. 27 is a timing chart depicting an example of a read operation of the second pixel 302 in the second embodiment of the present technology. Since the pixel 302 belongs to the (n+1)-th row, the vertical scanning circuit 211 drives the (n+1)-th row as illustrated in the drawing. The driving method is similar to that of the n-th row.

Note that the first and second modification examples of the first embodiment can be applied to the second embodiment.

As described above, according to the second embodiment of the present technology, since the comparator 271 determines illuminance before AD conversion, and the selector 261 switches the vertical signal line, the frequency of AD conversion can be reduced. Therefore, the reading speed can be improved.

Modification Example

In the second embodiment described above, the solid-state imaging element 200 sequentially reads the pixel signal of each of the two pixels in the pixel block 300, but with this configuration, there is a possibility that the reading speed is insufficient. This solid-state imaging element 200 of a modification example of the second embodiment is different from that of the first embodiment in that pixel addition is performed.

Figure 28:
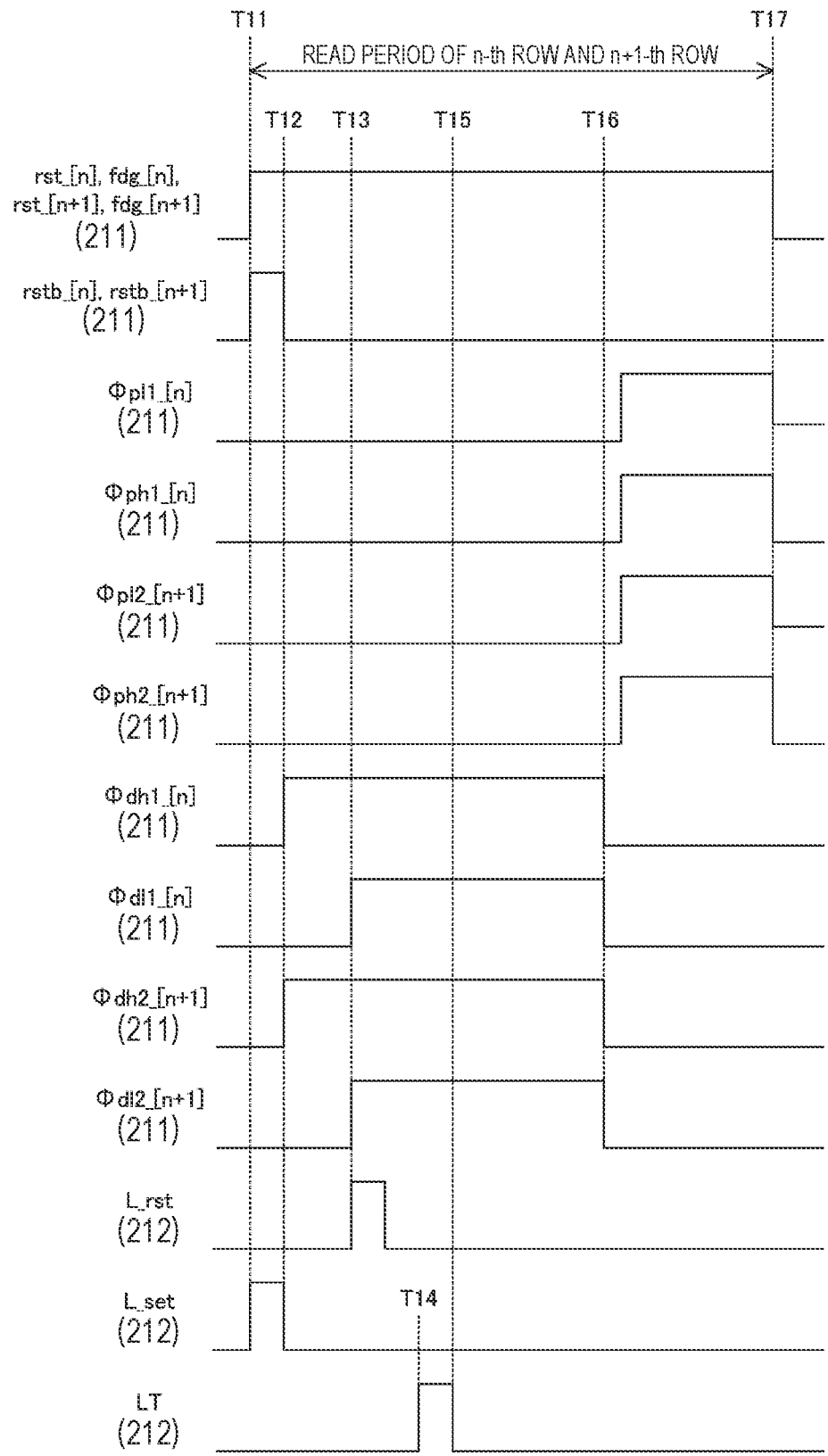
FIG. 28 is a timing chart depicting an example of a read operation of a pixel in a modification example of the second embodiment of the present technology.

FIG. 28 is a timing chart depicting an example of a read operation of the pixel in the modification example of the first embodiment of the present technology. Any of a plurality of modes including a non-addition mode in which pixel addition is not performed and an addition mode in which pixel addition is performed is set in the solid-state imaging element 200 in the modification example of the second embodiment. The global shutter operation and the read operation in the non-addition mode are similar to those in the second embodiment. The global shutter operation in the addition mode is similar to that in the non-addition mode.

In a case where the reading is performed in the addition mode, as illustrated in the drawing, the vertical scanning circuit 211 controls the selection signals Φdh2, Φdl2, Φpl2, and Φph2 at the same timing as the selection signals Φdh1, Φdl1, Φpl1, and Φph1.

Specifically, during a period from timing T12 to timing T16, the vertical scanning circuit 211 supplies the high-level selection signals Φdh1 and Φdh2 to the n-th row and the (n+1)-th row. During a period from timing T13 to timing T16, the vertical scanning circuit 211 supplies the high-level selection signals Φdl1 and Φdl2 to the n-th row and the (n+1)-th row.

Then, during a period from immediately after timing T16 to timing T17, the vertical scanning circuit 211 supplies the high-level selection signals Φpl1, Φph1, Φpl2, and Φph2 to the n-th row and the (n+1)-th row.

By the above-described control, the pixel signals of the two pixels are added. By this pixel addition, the sensitivity and the reading speed can be improved as compared with a case where addition is not performed. Furthermore, since the number of rows to be read for pixel addition is reduced, power consumption can be reduced.

As described above, according to the modification example of the second embodiment of the present technology, since the vertical scanning circuit 211 controls the selection signal of the pixel 301 at the same timing as the selection signal of the pixel 302, it is possible to add the respective pixel signals of the two pixels. Therefore, as compared with the case where the addition is not performed, the sensitivity and the reading speed can be improved and the power consumption can be reduced.

3. Application Example to Mobile Body

The technology according to the present disclosure (present technology) is applicable to various products. For example, the technology according to an embodiment of the present disclosure may be implemented as a device mounted on any type of mobile body such as an automobile, an electric vehicle, a hybrid electric vehicle, a motorcycle, a bicycle, a personal mobility, an airplane, a drone, a ship, or a robot.

Figure 29:
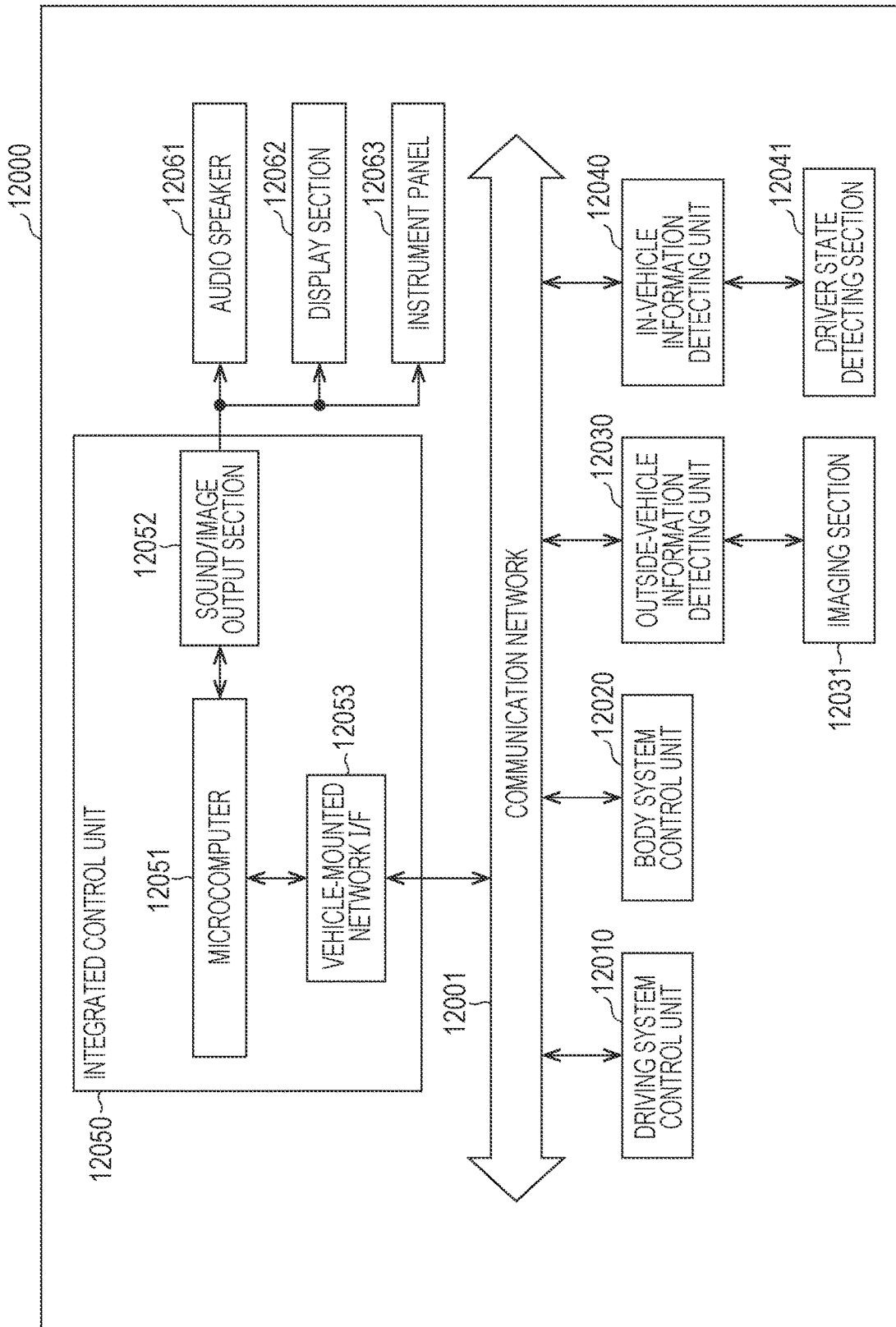
FIG. 29 is a block diagram depicting a schematic configuration example of a vehicle control system.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as functional components of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information about the outside of the vehicle, which is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display and a head-up display.

Figure 30:
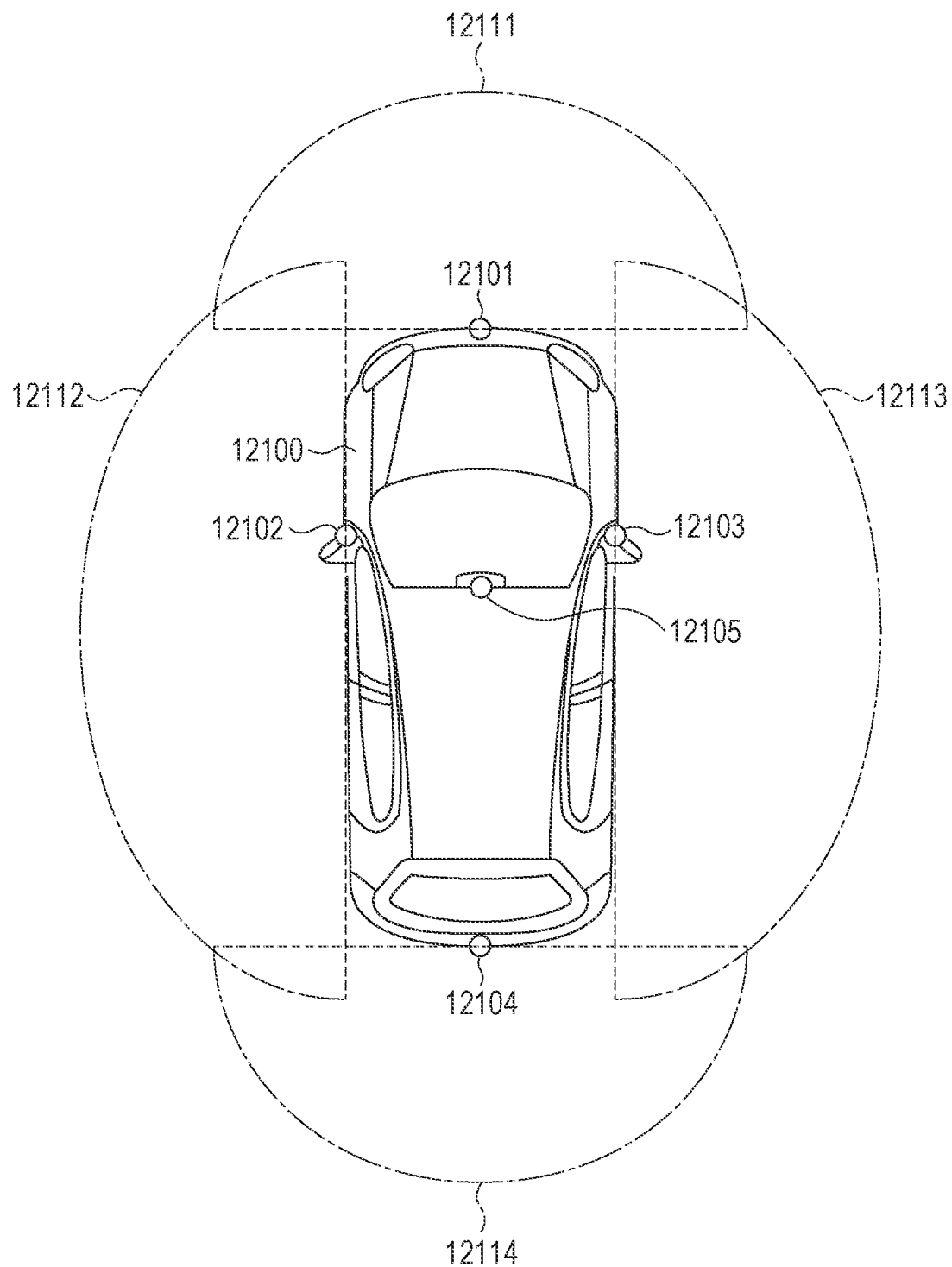
FIG. 30 is an explanatory diagram depicting an example of an installation position of an imaging section.

FIG. 30 is a diagram depicting an example of the installation position of the imaging section 12031.

In FIG. 30, the imaging section 12031 includes imaging sections 12101, 12102, 12103, 12104, and 12105.

The imaging sections 12101, 12102, 12103, 12104, and 12105 are, for example, provided at positions on a front nose, sideview mirrors, a rear bumper, and a back door of the vehicle 12100, and on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to an embodiment of the present disclosure can be applied has been described above. The technology according to the present disclosure can be applied, for example, to the imaging section 12031 among the configurations described above. Specifically, the imaging device 100 in FIG. 1 can be applied to the imaging section 12031. By applying the technology according to an embodiment of the present disclosure to the imaging section 12031, as a result of achieving both a reduction in noise and an improvement in sensitivity, a more easily viewable captured image can be obtained, so that driver's fatigue can be reduced.

Note that, the above embodiments show examples for embodying the present technology, and matters in the embodiments and matters specifying the invention in claims have correspondence relationships. Similarly, the matters specifying the invention in the claims and matters having the same names in the embodiments of the present technology have correspondence relationships. However, the present technology is not limited to the embodiments and can be embodied by making various modifications to the embodiments without departing from the gist thereof.

Note that effects described in the present description are merely examples and are not limited, and other effects may be provided.

Note that the present technology may also have a following configuration.

(1) A solid-state imaging element including:
a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged;

first, second, third, and fourth capacitive elements having their respective one ends commonly connected to the pre-stage circuit;
a selection circuit that selects one of their respective another ends of the first, second, third, and fourth capacitive elements and connects the selected another end to a predetermined post-stage node; and
a post-stage circuit that reads, via the post-stage node, a reset level obtained by amplifying the voltage when the pair of floating diffusion layers is initialized and a signal level obtained by amplifying the voltage when the charges are transferred.

(2) The solid-state imaging element described in (1), in which
the conversion efficiency control transistor controls the conversion efficiency to either high conversion efficiency higher than a predetermined value or low conversion efficiency lower than the predetermined value,
the first capacitive element holds the reset level when the conversion efficiency is the high conversion efficiency as a high conversion (HC) reset level,
the second capacitive element holds the signal level when the conversion efficiency is the high conversion efficiency as an HC signal level,
the third capacitive element holds the reset level when the conversion efficiency is the low conversion efficiency as a low conversion (LC) reset level, and
the fourth capacitive element holds the signal level when the conversion efficiency is the low conversion efficiency as an LC signal level.

(3) The solid-state imaging element described in (2), further including:
an analog to digital conversion unit that converts each of the HC reset level, the HC signal level, the LC reset level, and the LC signal level into a digital signal;
a correlated double sampling processing unit that calculates a difference between the digital signal corresponding to the HC reset level and the digital signal corresponding to the HC signal level as HC difference data, and calculates a difference between the digital signal corresponding to the LC reset level and the digital signal corresponding to the LC signal level as LC difference data;
an illuminance determination unit that determines whether or not illuminance is higher than a predetermined value on the basis of the HC difference data and generates a determination result; and
a post-stage selector that selects one of the HC difference data or the LC difference data on the basis of the determination result.

(4) The solid-state imaging element described in (2) or (3), in which
the post-stage node includes an HC-side post-stage node and an LC-side post-stage node,
the selection circuit includes
an HC-side selection circuit that selects one of their respective another ends of the first and second capacitive elements and connects the selected another end to the HC-side post-stage node, and
an LC-side selection circuit that selects one of their respective another ends of the third and fourth capacitive elements and connects the selected another end to the LC-side post-stage node, and
the post-stage circuit includes
an HC-side post-stage circuit that reads the HC signal level and the HC reset level from the HC-side post-stage node and outputs the HC signal level and the HC reset level through an HC-side vertical signal line, and an LC-side post-stage circuit that reads the LC signal level and the LC reset level from the LC-side post-stage node and outputs the LC signal level and the LC reset level through an LC-side vertical signal line.

(5) The solid-state imaging element described in (4), further including:

a pre-stage selector that selects one of a potential of the HC-side vertical signal line or a potential of the LC-side vertical signal line in accordance with a predetermined latch output signal and outputs the selected potential as an output potential;

a comparator that compares the output potential with a predetermined reference voltage and outputs a comparison result;

a latch circuit that generates the latch output signal on the basis of the comparison result; and a counter that counts a count value over a period until the comparison result is inverted.

(6) The solid-state imaging element described in (4) or (5), further including fifth, sixth, seventh, and eighth capacitive elements, in which the pair of floating diffusion layers includes a pair of first floating diffusion layers in a first pixel and a pair of second floating diffusion layers in a second pixel, the conversion efficiency control transistor includes a first conversion efficiency control transistor in the first pixel and a second conversion efficiency control transistor in the second pixel, the pre-stage circuit includes a first pre-stage circuit in which the pair of first floating diffusion layers and the first conversion efficiency control transistor are arranged, and a second pre-stage circuit in which the pair of second floating diffusion layers and the second conversion efficiency control transistor are arranged, the first, second, third, and fourth capacitive elements have their respective one ends commonly connected to the first pre-stage circuit, and the fifth, sixth, seventh, and eighth capacitive elements have their respective one ends commonly connected to the second pre-stage circuit.

(7) The solid-state imaging element described in any one of (1) to (6), in which the pre-stage circuit is provided in a first chip, and the first, second, third, and fourth capacitive elements, the selection circuit, and the post-stage circuit are provided in a second chip.

(8) The solid-state imaging element described in (7), further including an analog to digital converter that sequentially converts the reset level and the signal level into a digital signal, the analog to digital converter being provided in a third chip.

(9) An imaging device including:

a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged;

first, second, third, and fourth capacitive elements having their respective one ends commonly connected to the pre-stage circuit;

a selection circuit that selects one of their respective another ends of the first, second, third, and fourth capacitive elements and connects the selected another end to a predetermined post-stage node;

a post-stage circuit that reads, via the post-stage node, a reset level obtained by amplifying the voltage when the pair of floating diffusion layers is initialized and a signal level obtained by amplifying the voltage when the charges are transferred; and a signal processing circuit that processes the reset level and the signal level.

(10) A method for controlling a solid-state imaging element including:

selecting one of their respective another ends of first, second, third, and fourth capacitive elements having their respective one ends commonly connected to a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged and connecting the selected another end to a predetermined post-stage node; and reading, via the post-stage node, a reset level obtained by amplifying the voltage when the pair of floating diffusion layers is initialized and a signal level obtained by amplifying the voltage when the charges are transferred.

REFERENCE SIGNS LIST

100 Imaging device
110 Imaging lens
120 Recording unit
130 Imaging control unit
200 Solid-state imaging element
201 Pixel chip
202 Circuit chip
203 Upper pixel chip
204 Lower pixel chip
211 Vertical scanning circuit
212 Timing control circuit
213 DAC
220 Pixel array unit
221 Upper pixel array unit
222 Lower pixel array unit
250 Load MOS circuit block
251, 252 Load MOS transistor
260 Column signal processing circuit
261, 411, 413, 416 Selector
262 Latch circuit
270 ADC
271 Comparator
272, 273 Auto-zero switch
274 Counter
300 Pixel block
301, 302 Pixel
310, 510 Pre-stage circuit
311, 511 Photoelectric conversion element
312, 512 Transfer transistor
313, 513 FD reset transistor
314, 318, 514, 518 FD
315, 515 Pre-stage amplification transistor
316, 516 Current source transistor
317, 517 Conversion efficiency control transistor
331 to 334, 531 to 534 Capacitive element 350 Selection circuit
351 to 354, 551 to 554 Selection transistor
355 HC-side selection circuit
356 LC-side selection circuit
361, 366 Post-stage reset transistor
370 Post-stage circuit
371, 377 Post-stage amplification transistor
372, 378 Post-stage selection transistor
375 HC-side post-stage circuit
376 LC-side post-stage circuit
400 Digital signal processing unit
412, 415 Memory
414 Illuminance determination unit
417 Digital gain correction unit
420 CDS processing unit
421 Subtractor
12031 Imaging section

The invention claimed is:

1. A solid-state imaging element comprising:
a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged;
first, second, third, and fourth capacitive elements having their respective one ends commonly connected to the pre-stage circuit;
a selection circuit that selects one of their respective another ends of the first, second, third, and fourth capacitive elements and connects the selected another end to a predetermined post-stage node; and
a post-stage circuit that reads, via the post-stage node, a reset level obtained by amplifying the voltage when the pair of floating diffusion layers is initialized and a signal level obtained by amplifying the voltage when the charges are transferred.

2. The solid-state imaging element according to claim 1, wherein
the conversion efficiency control transistor controls the conversion efficiency to either high conversion efficiency higher than a predetermined value or low conversion efficiency lower than the predetermined value,
the first capacitive element holds the reset level when the conversion efficiency is the high conversion efficiency as a high conversion (HC) reset level,
the second capacitive element holds the signal level when the conversion efficiency is the high conversion efficiency as an HC signal level,
the third capacitive element holds the reset level when the conversion efficiency is the low conversion efficiency as a low conversion (LC) reset level, and
the fourth capacitive element holds the signal level when the conversion efficiency is the low conversion efficiency as an LC signal level.

3. The solid-state imaging element according to claim 2, further comprising:
an analog to digital conversion unit that converts each of the HC reset level, the HC signal level, the LC reset level, and the LC signal level into a digital signal;
a correlated double sampling processing unit that calculates a difference between the digital signal corresponding to the HC reset level and the digital signal corresponding to the HC signal level as HC difference data, and calculates a difference between the digital signal corresponding to the LC reset level and the digital signal corresponding to the LC signal level as LC difference data;
an illuminance determination unit that determines whether or not illuminance is higher than a predetermined value on a basis of the HC difference data and generates a determination result; and
a post-stage selector that selects one of the HC difference data or the LC difference data on a basis of the determination result.

4. The solid-state imaging element according to claim 2, wherein
the post-stage node includes an HC-side post-stage node and an LC-side post-stage node,
the selection circuit includes
an HC-side selection circuit that selects one of their respective another ends of the first and second capacitive elements and connects the selected another end to the HC-side post-stage node, and
an LC-side selection circuit that selects one of their respective another ends of the third and fourth capacitive elements and connects the selected another end to the LC-side post-stage node, and
the post-stage circuit includes
an HC-side post-stage circuit that reads the HC signal level and the HC reset level from the HC-side post-stage node and outputs the HC signal level and the HC reset level through an HC-side vertical signal line, and
an LC-side post-stage circuit that reads the LC signal level and the LC reset level from the LC-side post-stage node and outputs the LC signal level and the LC reset level through an LC-side vertical signal line.

5. The solid-state imaging element according to claim 4, further comprising:
a pre-stage selector that selects one of a potential of the HC-side vertical signal line or a potential of the LC-side vertical signal line in accordance with a predetermined latch output signal and outputs the selected potential as an output potential;
a comparator that compares the output potential with a predetermined reference voltage and outputs a comparison result;
a latch circuit that generates the latch output signal on a basis of the comparison result; and
a counter that counts a count value over a period until the comparison result is inverted.

6. The solid-state imaging element according to claim 4, further comprising
fifth, sixth, seventh, and eighth capacitive elements, wherein
the pair of floating diffusion layers includes a pair of first floating diffusion layers in a first pixel and a pair of second floating diffusion layers in a second pixel,
the conversion efficiency control transistor includes a first conversion efficiency control transistor in the first pixel and a second conversion efficiency control transistor in the second pixel,
the pre-stage circuit includes
a first pre-stage circuit in which the pair of first floating diffusion layers and the first conversion efficiency control transistor are arranged, and
a second pre-stage circuit in which the pair of second floating diffusion layers and the second conversion efficiency control transistor are arranged,
the first, second, third, and fourth capacitive elements have their respective one ends commonly connected to the first pre-stage circuit, and the fifth, sixth, seventh, and eighth capacitive elements have their respective one ends commonly connected to the second pre-stage circuit.

7. The solid-state imaging element according to claim 1, wherein
the pre-stage circuit is provided in a first chip, and
the first, second, third, and fourth capacitive elements, the selection circuit, and the post-stage circuit are provided in a second chip.

8. The solid-state imaging element according to claim 7, further comprising
an analog to digital converter that sequentially converts the reset level and the signal level into a digital signal, the analog to digital converter being provided in a third chip.

9. An imaging device comprising:
a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged;
first, second, third, and fourth capacitive elements having their respective one ends commonly connected to the pre-stage circuit;
a selection circuit that selects one of their respective another ends of the first, second, third, and fourth capacitive elements and connects the selected another end to a predetermined post-stage node;
a post-stage circuit that reads, via the post-stage node, a reset level obtained by amplifying the voltage when the pair of floating diffusion layers is initialized and a signal level obtained by amplifying the voltage when the charges are transferred; and
a signal processing circuit that processes the reset level and the signal level.

10. A method for controlling a solid-state imaging element comprising:
selecting one of their respective another ends of first, second, third, and fourth capacitive elements having their respective one ends commonly connected to a pre-stage circuit in which a pair of floating diffusion layers that converts transferred charges into a voltage and a conversion efficiency control transistor that controls conversion efficiency with which the charges are converted into the voltage by opening and closing a path between the pair of floating diffusion layers are arranged and connecting the selected another end to a predetermined post-stage node; and
reading, via the post-stage node, a reset level obtained by amplifying the voltage when the pair of floating diffusion layers is initialized and a signal level obtained by amplifying the voltage when the charges are transferred.

* * * * *